United States Patent
Homma et al.

(10) Patent No.: US 8,949,133 B2
(45) Date of Patent: Feb. 3, 2015

(54) INFORMATION RETRIEVING APPARATUS

(75) Inventors: Takeshi Homma, Fuchu (JP); Hiroaki Kokubo, Tokyo (JP); Yoshiyuki Mizuno, Zama (JP)

(73) Assignee: Clarion Co., Ltd., Saitama-shi (JP)

( * ) Notice: Subject to any disclaimer, the term of this patent is extended or adjusted under 35 U.S.C. 154(b) by 496 days.

(21) Appl. No.: 13/395,080

(22) PCT Filed: Sep. 9, 2010

(86) PCT No.: PCT/JP2010/065502
§ 371 (c)(1),
(2), (4) Date: Mar. 8, 2012

(87) PCT Pub. No.: WO2011/030817
PCT Pub. Date: Mar. 17, 2011

(65) Prior Publication Data
US 2012/0173574 A1 Jul. 5, 2012

(30) Foreign Application Priority Data

Sep. 9, 2009 (JP) .................... 2009-208045

(51) Int. Cl.
*G10L 21/00* (2013.01)
*G10L 15/19* (2013.01)
(Continued)

(52) U.S. Cl.
CPC .............. *G10L 15/19* (2013.01); *G10L 15/265* (2013.01); *G06F 17/2795* (2013.01); *G06F 17/30749* (2013.01); *G10L 15/065* (2013.01); *G10L 15/187* (2013.01)
USPC ............. 704/275; 704/270; 704/251; 704/10; 704/231

(58) Field of Classification Search
CPC .............. G10L 15/265; G10L 15/1815; G10L 2015/088; G10L 15/197; G10L 15/22; G10L 15/30; G10L 15/18; G10L 15/063; G10L 15/285; G10L 15/144; G10L 15/065; G06F 17/2795
USPC ......... 704/275, 251, 270, 255, 231, 257, 235, 704/244, 270.1, E15.04, E15.044, E15.008; 379/88.01, 88.03, 88.16; 707/772
See application file for complete search history.

(56) References Cited

U.S. PATENT DOCUMENTS 5,758,322 A * 5/1998 Rongley .................... 704/275
5,774,860 A * 6/1998 Bayya et al. ................ 704/275
(Continued)

FOREIGN PATENT DOCUMENTS

JP 2003-302994 A 10/2003
JP 2004-133003 A 4/2004
(Continued)

OTHER PUBLICATIONS

Iwase Shigehito: "Company Name Analysis Using Natural Language Processing", Electronic Information Technology Academy Paper, vol. J 82-DII, No. 8, pp. 1305-1314, 1999 (ten (10) sheets).
(Continued)

*Primary Examiner* — Vijay B Chawan
(74) *Attorney, Agent, or Firm* — Crowell & Moring LLP

(57) ABSTRACT

An information retrieving apparatus is provided which has excellent usability using voice inputs. Search queries input by a user via a touch panel or the like are used as voice recognition vocabulary. Further, the search queries are edited by use of morpheme information and/or other information in a database, thereby providing such voice recognition vocabulary that can be easily uttered by the user.

13 Claims, 22 Drawing Sheets

(51) Int. Cl.
*G10L 15/26* (2006.01)
*G06F 17/30* (2006.01)
*G10L 15/065* (2013.01)
*G10L 15/187* (2013.01)
*G06F 17/27* (2006.01)

(56) References Cited

U.S. PATENT DOCUMENTS

| | | | |
|---|---|---|---|
| 5,937,383 A * | 8/1999 | Ittycheriah et al. | 704/255 |
| 5,960,394 A * | 9/1999 | Gould et al. | 704/270.1 |
| 6,088,669 A * | 7/2000 | Maes | 704/231 |
| 6,101,468 A * | 8/2000 | Gould et al. | 704/251 |
| 6,185,535 B1 * | 2/2001 | Hedin et al. | 704/270 |
| 6,282,511 B1 * | 8/2001 | Mayer | 704/270 |
| 6,324,513 B1 * | 11/2001 | Nagai et al. | 704/275 |
| 2002/0169611 A1 * | 11/2002 | Guerra et al. | 704/270 |
| 2005/0005266 A1 * | 1/2005 | Datig | 717/136 |
| 2007/0162281 A1 * | 7/2007 | Saitoh et al. | 704/251 |
| 2009/0083029 A1 * | 3/2009 | Doi et al. | 704/200 |

FOREIGN PATENT DOCUMENTS

| | | | |
|---|---|---|---|
| JP | 2007-213005 A | 8/2007 | |
| JP | 2008-46260 A | 2/2008 | |
| JP | 2009-80579 A | 4/2009 | |
| JP | 2009-109758 A | 5/2009 | |

OTHER PUBLICATIONS

Shikano, Ito, Kawahara, Takeda, Yamamoto: IT Text "Voice Recognizing System", p. 133 of Ohmsha (2001) (two (2) sheets).

Shikano, Takeda, Kawahara, Ito, Yamada, Ito, Utsuro, Kobayashi, Sagayama, Minematsu, Yamamoto: "Japanese Dictation Software Toolkit", 19 IPA Technology Presentation Paper (2000) (http://www.ipa.go.ip/SYMPO/sympo2000/pdf/ipa19_1_51_1.pdf) (ten (10) sheets).

Kai-Fu Lee, foreword by Raj Reddy : "Automatic Speech Recognition: The Development of the Sphinx Recognition System". Kluwer Academic Publishers (1989) (twenty-four (24) sheets).

Lawrence Rabiner, Biing-Hwang Juang: "Fundamentals of Speech Recognition", Prentice Hall PTR (1993) (seventy-six (76) sheets).

Masanori Enoki, : "Automatic Generation Abbriviated Forms of Japanese Expressions and its Apprications to Speech Recognition", IPSJ SIG Technical Reports, Dec. 21, 2007, vol. 2007, No. 129, pp. 313-318 (six (6) sheets).

International Search Report dated Dec. 7, 2010 including English-language translation (Seven (7) pages).

* cited by examiner

FIG. 2A

| NAME | READING (WORD CLASS) | MAIN CATEGORY | SUB CATEGORY | ADDRESS | ADDITIONAL VOICE RECOGNIZED VOCABULARY |
|---|---|---|---|---|---|
| OGIKUBO STATION | OGIKUBO (PLACE NAME)/ STATION (CATEGORY OF BUSINESS) | STATION | CENTRAL LINE | SUGINAMI-KU, TOKYO | |
| ... | | | | | |
| SUPER FUNITTO KOKUBUNJI STORE | SUPER (CATEGORY OF BUSINESS)/ FUNITTO (SPECIFIC NAME)/KOKUBUNJI (PLACE NAME)/STORE (OTHERS) | SUPER MARKET | SUPER FUNITTO | KOKUBUNNJI-SHI, TOKYO | |
| SUPER FUNITTO FUCHU STORE | SUPER (CATEGORY OF BUSINESS)/ FUNITTO (SPECIFIC NAME)/FUCHU (PLACE NAME)/STORE (OTHERS) | SUPER MARKET | SUPER FUNITTO | FUCHU-SHI, TOKYO | |
| FRESH MARKET KUNITACHI STORE | SHINSEN (SPECIFIC NAME)/MARKET (CATEGORY OF BUSINESS)/KUNITACHI (PLACE NAME)/STORE (OTHERS) | SUPER MARKET | FRESH MARKET | KUNITACHI-SHI, TOKYO | |
| FUNITSURU HOTEL | FUNITSURU (SPECIFIC NAME)/ HOTEL (CATEGORY OF BUSINESS) | LODGING FACILITY | HOT SPRING HOTEL | SHIZUOKA-KEN, OO-SHI | |
| | | LEISURE | SWIMMING PLACE | | |
| ... | | | | | |
| SAPPORO MAKOMANAI BEACH | SAPPORO (PLACE NAME)/ MAKOMANAI (PLACE NAME)/ BEACH (CATEGORY OF BUSINESS) | | | MINAMI-KU, SAPPORO-SHI, HOKKAIDO | |
| ... | | | | | |

FIG. 2B

| ID NO. | NAME | READING (WORD CLASS) | MAIN CATEGORY | SUB CATEGORY | ADDRESS |
|---|---|---|---|---|---|
| 0001 | OGIKUBO STATION | OGIKUBO (PLACE NAME)/ STATION (CATEGORY OF BUSINESS) | STATION | CENTRAL LINE | SUGINAMI-KU, TOKYO |
| ... | ... | | | | |
| 0200 | SUPER FUNITTO KOKUBUNJI STORE | SUPER (CATEGORY OF BUSINESS)/ FUNITTO (SPECIFIC NAME)/KOKUBUNJI (PLACE NAME)/STORE (OTHERS) | SUPER MARKET | SUPER FUNITTO | KOKUBUNNJI-SHI, TOKYO |
| 0201 | SUPER FUNITTO FUCHU STORE | SUPER (CATEGORY OF BUSINESS)/ FUNITTO (SPECIFIC NAME)/FUCHU (PLACE NAME)/STORE (OTHERS) | SUPER MARKET | SUPER FUNITTO | FUCHU-SHI, TOKYO |
| 0202 | FRESH MARKET KUNITACHI STORE | SHINSEN (SPECIFIC NAME)/MARKET (CATEGORY OF BUSINESS)/KUNITACHI (PLACE NAME)/STORE (OTHERS) | SUPER MARKET | FRESH MARKET | KUNITACHI-SHI, TOKYO |
| 0203 | FUNITSURU HOTEL | FUNITSURU (SPECIFIC NAME)/ HOTEL (CATEGORY OF BUSINESS) | LODGING FACILITY | HOT SPRING HOTEL | SHIZUOKA-KEN, OO-SHI |
| ... | ... | | | | |
| 0500 | SAPPORO MAKOMANAI BEACH | SAPPORO (PLACE NAME)/ MAKOMANAI (PLACE NAME)/ BEACH (CATEGORY OF BUSINESS) | LEISURE | SWIMMING PLACE | MINAMI-KU, SAPPORO-SHI, HOKKAIDO |
| ... | ... | | | | |

| WORD LABEL | PHONEME |
|---|---|
| OGIKUBO STATION | |
| ... | |
| SUPER FUNITTO KOKUBUNJI STORE | |
| SUPER FUNITTO FUCHU STORE | |
| ... | |
| GO TO FUNITTO | |
| ... | |
| NEARBY FUNITTO | |

FIG. 3C

| WORD LABEL | PHONEME | CORRESPONDING ID NO. |
|---|---|---|
| OGIKUBO STATION | | 0001 |
| ... | | |
| SUPER FUNITTO KOKUBUNJI STORE | | 0200 |
| SUPER FUNITTO FUCHU STORE | | 0201 |
| ... | | |
| GO TO FUNITTO | | 0201 |
| ... | | |
| NEARBY FUNITTO | | 500001 |

| COMBINATION OF MORPHEME | LEVEL OF IMPORTANCE OF COMBINATION | SIMILARITY |
|---|---|---|
| FUNITTO | 1.4 | 0 |
| SUPER/FUNITTO | 1.1 → 0 | 1 |
| FUNITTO/FUCHU | 1 | 0 |
| SUPER/FUNITTO/FUCHU | 0.93 | 0 |
| ... | ... | ... |
| SUPER/STORE | 0.45 | 0 |
| FUCHU/STORE | 0.35 | 0 |
| STORE | 0.1 | 0 |

FIG. 9C

| COMBINATION OF MORPHEME (WORD CLASS) | LEVEL OF IMPORTANCE OF COMBINATION BEFORE CORRECTION | IS COMBINATION OF DIFFERENT WORD CLASSES? (ADDITIONAL VALUE) | LEVEL OF IMPORTANCE OF COMBINATION AFTER CORRECTION |
|---|---|---|---|
| SAPPORO (PLACE NAME) / MAKOMANAI (PLACE NAME) / BEACH (CATEGORY OF BUSINESS) | 0.8 | NO | 0.8 |
| SAPPORO (PLACE NAME) / MAKOMANAI (PLACE NAME) | 0.8 | NO | 0.8 |
| SAPPORO (PLACE NAME) / BEACH (CATEGORY OF BUSINESS) | 0.65 | YES [+0.2] | 0.85 |
| MAKOMANAI (PLACE NAME) / BEACH (CATEGORY OF BUSINESS) | 0.95 | YES [+0.2] | 1.15 |
| SAPPORO (PLACE NAME) | 0.5 | — | 0.5 |
| MAKOMANAI (PLACE NAME) | 1.1 | — | 1.1 |
| BEACH (CATEGORY OF BUSINESS) | 0.8 | — | 0.8 |

FIG. 10B

| COMBINATION OF MORPHEME (WORD CLASS) [LEVEL OF IMPORTANCE OF MORPHEME] | LEVEL OF IMPORTANCE OF COMBINATION BEFORE CORRECTION | ADD FROM ADDRESS (ADDITIONAL VALUE) | ADD FROM CATEGORY (ADDITIONAL VALUE) | COMBINATION OF MORPHEME (LEVEL OF IMPORTANCE OF COMBINATION) |
|---|---|---|---|---|
| SAPPORO (PLACE NAME) [0.5]/ MAKOMANAI (PLACE NAME) [1.1]/ BEACH (CATEGORY OF BUSINESS) [0.8] | 0.8 | — | — | SAPPORO MAKOMANAI BEACH [0.8] |
| SAPPORO (PLACE NAME) [0.5]/ MAKOMANAI (PLACE NAME) [1.1] | 0.8 | — | SWIMMING PLACE [+0.5] | SWIMMING PLACE IN SAPPORO MAKOMANAI [1.3] |
| SAPPORO (PLACE NAME) [0.5]/ BEACH (CATEGORY OF BUSINESS) [0.8] | 0.65 | — | — | SAPPORO BEACH [0.65] |
| MAKOMANAI (PLACE NAME) [1.1]/ BEACH (CATEGORY OF BUSINESS) [0.8] | 0.95 | — | — | MAKOMANAI BEACH [0.95] |
| SAPPORO (PLACE NAME) [0.5] | 0.5 | — | SWIMMING PLACE [+0.5] | SWIMMING PLACE IN SAPPORO [1.0] |
| MAKOMANAI (PLACE NAME) [1.1] | 1.1 | — | SWIMMING PLACE [+0.5] | SWIMMING PLACE IN MAKOMANAI [1.6] |
| BEACH (CATEGORY OF BUSINESS) [0.8] | 0.8 | MINAMI-KU [+0.5] | — | BEACH IN MINAMI-KU [1.3] |

| ID NO. OF SUB CATEGORY ~1305 | SUB CATEGORY ~1310 | VOCABULARY OF FACILITY CATEGORY ~1320 |
|---|---|---|
| 500001 | SUPER FUNITTO | FUNITTO<br>SUPER FUNITTO |
| 500002 | FRESH MARKET | FRESH<br>FRESH MARKET |
| ... | ... | ... |

| ID NO. OF SUB CATEGORY ~1330 | ID NO. OF CORRESPONDING FACILITY ~1340 |
|---|---|
| 500001 | 0200<br>0201<br>... |
| 500002 | 0202<br>... |
| ... | ... |

1302

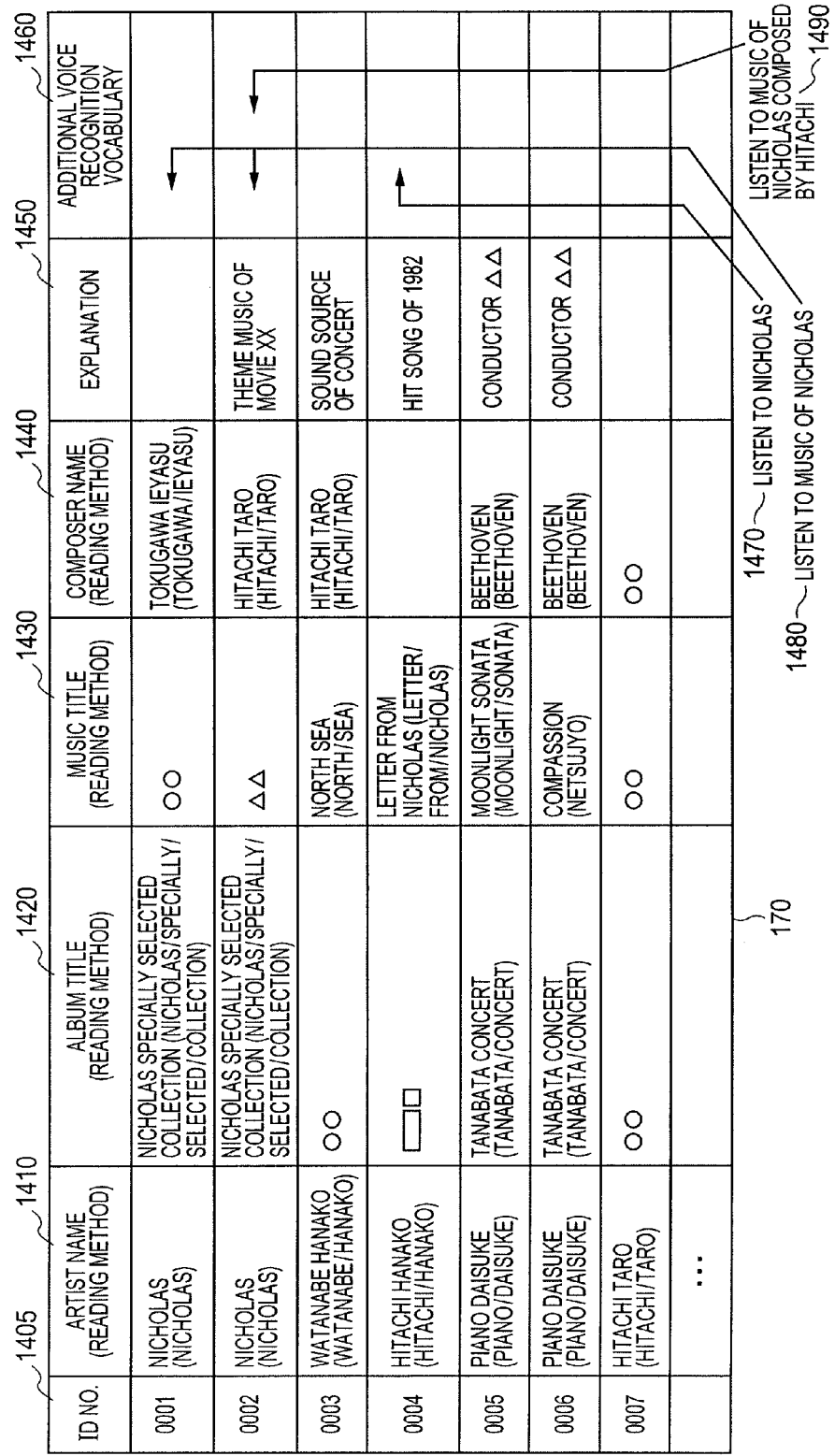

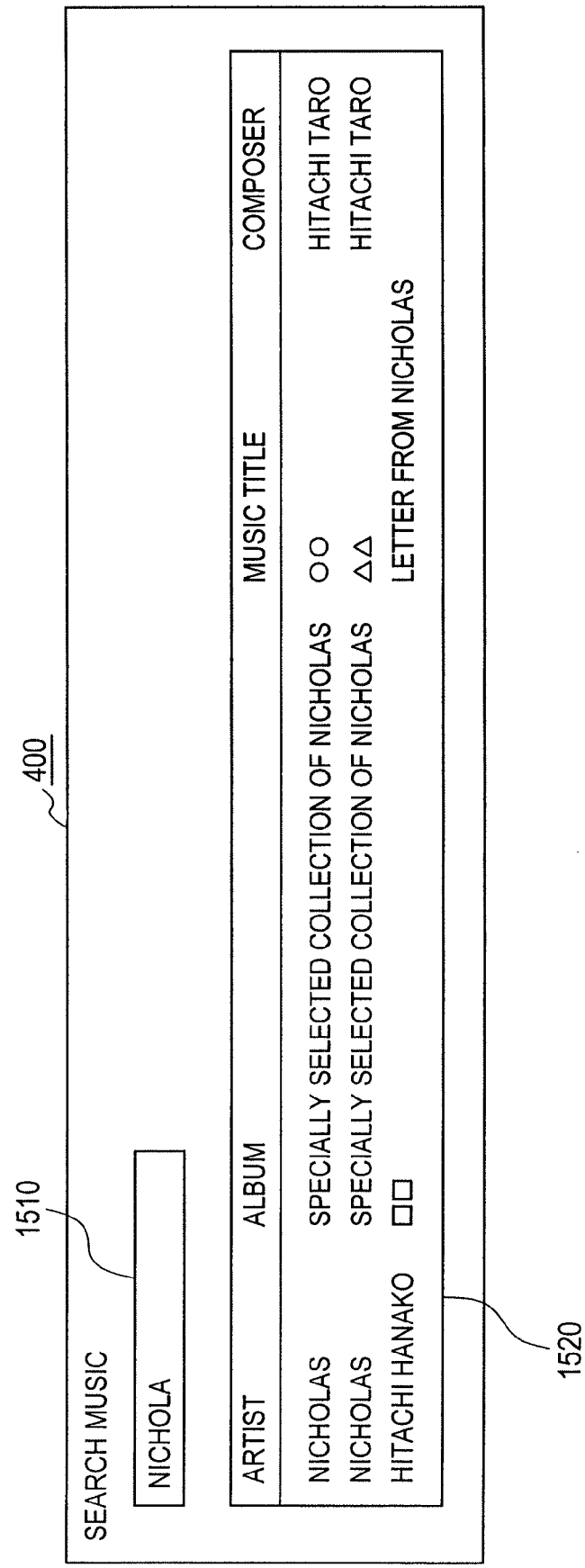

FIG. 17

| WORD LABEL | PHONEME | CORRESPONDING ID NO. |
|---|---|---|
| SPECIALLY SELECTED COLLECTION OF NICHOLAS | | 0001, 0002 |
| TANABATA CONCERT | | 0005, 0006 |
| TANABATA | | 0005, 0006 |
| ... | | |
| LISTEN TO NICHOLAS | | 0004 |
| LISTEN TO MUSIC OF NICHOLAS | | 0001, 0002 |
| ... | | |

INFORMATION RETRIEVING APPARATUS

TECHNICAL FIELD

The present invention relates to an information retrieving apparatus, an information retrieving method, and a navigation system, and more particularly, to an information retrieving apparatus, an information retrieving method, and a navigation system that customize a voice recognized dictionary using a text query.

BACKGROUND ART

To extract user desired data from a database, known is an information retrieving apparatus that enables a user to input a few of characters constituting a target name, provides the user with data matching the input characters, and enables the user to selectively designate the provided data. Further, a method in which a user speaks a corresponding name through a voice input and data is retrieved using the result of the voice recognition is known.

A representative information retrieving apparatus includes a task of setting a destination in a car navigation system, search of music in an audio system, and the like.

The car navigation system uses an information search interface as above to retrieve facility names present cross the country and to set a destination. In this information search, first, a user inputs a portion of a facility name via a touch panel or a remote controller in a car navigation system. Next, by pressing a search button, a list of facilities including a character string input by the user is displayed. By selecting a facility name from the list of facilities, a destination may be set. Further, the user may set the destination by vocally speaking a facility name.

An input via the touch panel or the remote controller has a merit capable of performing search by partially inputting a known name without a need to input the whole name. However, an operation of pressing a button and the like needs to be performed a plurality number of times and thus, the operation takes a long time. Meanwhile, an input using a voice recognizing function has a merit capable of performing the input within a short period of time since the input is over once the user speaks a name. However, since a recognition rate of the voice recognition is not 100%, a recognition error occurs and thus, the operation may need to be performed again. Further, in the voice recognition of the car navigation system, it is normal to maintain the number of perceivable vocabularies to be small in order to increase a recognition rate and to decrease a processing time during voice recognition of the car navigation system. Therefore, generally, it is possible to receive only a formal name of a facility and the number of receivable facilities is limited. Therefore, even though the user speaks a name that naturally comes up to the user, the car navigation system does not recognize the name and thus, there is an issue in that the user cannot input a desired destination. This issue is generally referred to as a vocabulary excluding speech.

To solve the above issue, a function enabling the user to register a voice recognized vocabulary with respect to a predetermined facility is known (hereinafter, referred to as a voice recognized vocabulary registering function). In this function, the user initially selects a desired facility according to a method such as inputting a name, an address, and the like, via a touch panel or a remote controller. Next, the user inputs a vocabulary to be used for voice recognition with respect to the selected facility. As the input method, an input of a Kana character via the touch panel or the remote controller or an input method using voice is known. For example, the user selects a home address of Mr. Suzuki that is a friend of the user and in this state, sets "Suzukisanchi" using "Yomigana". Accordingly, by later speaking "Suzukisanchi" as the voice input, the user may execute a predetermined operation of the car navigation system such as setting of a destination to the home of Mr. Suzuki.

Further, Patent Literature 1 discloses a technology of creating a substitute vocabulary by applying a word substitution rule with respect to a formal facility name, and registering the created substitute vocabulary to a voice recognized dictionary, thereby recognizing a corresponding name even though a user speaks a vocabulary that does not correspond to a formal name.

CITATION LIST

Patent Literature

Patent Literature 1: JP-A No. 2004-133003

SUMMARY OF INVENTION

Technical Problem

In a voice recognized vocabulary registering function installed in a navigation system, a user had to clearly call the above function. That is, to employ the voice recognized vocabulary registering function, the user had to select a corresponding facility and then register "Yomigana" thereof via a touch panel and the like. Therefore, there was an issue in that it takes time to use the voice recognizing function.

The technology disclosed in Patent Literature 1 does not consider an aspect of reflecting knowledge of each individual user in the word substitution rule for adding a voice recognized dictionary. Therefore, there was an issue such as that a vocabulary which the user is aware of is not necessarily registered to the voice recognized dictionary, or that a vocabulary which the user is unaware of is registered to the voice recognized dictionary.

It is an object of the present invention to provide an information retrieving apparatus, an information retrieving method, and a navigation system using the same that may be readily used by a user when performing search using a voice input.

Solution to Problem

A representative example of the present invention is given as follows. That is, an information retrieving apparatus of the present invention includes: a name database that registers at least one record as a unit, each of the record contains at least one attribute to be retrieved and a value associated with the attribute, wherein the value is content about each of the attribute; an operation input unit that receives an operation input of a user; a voice input unit that receives a voice input of the user; a voice recognizing unit that recognizes voice obtained from the voice input unit as a character string; a sound model storing unit that stores sound data referred to by the voice recognizing unit; a language model storing unit that stores, as a language model, a vocabulary recognized by the voice recognizing unit and a connection rule of the corresponding vocabulary; a retrieving unit that retrieves the value of the attribute included in the name database using an input character string input from the operation input unit or the voice recognizing unit, and creates, as a candidate, the record in which the input character string is included in the value; an output unit that outputs, as the search result, the candidate of the record created by the retrieving unit; a selecting means that selects the output candidate of the record; and a recognized vocabulary producing unit that receives a selection result of the record by the selecting means, and produces a new additionally recognized vocabulary that is a voice recognized vocabulary to be added to the language model. The recognized vocabulary producing unit may record, in the name database or the language model, a corresponding relationship between the additionally recognized vocabulary corresponding to the input character string and the selected record.

Advantageous Effects of Invention

According to the present invention, it is possible to process a character string (search query) for information search, generally used by a user, to be easily spoken by the user and to register the character string as a voice recognized vocabulary. Therefore, it is possible to decrease the inconvenience of the user with respect to use of a voice recognizing function, and to improve usage convenience of an information retrieving apparatus. Further, a search query used by the user is used as the voice recognized vocabulary and thus, a vocabulary which the user is aware of may be used as the voice recognized vocabulary. Accordingly, a frequency of a vocabulary excluding speech may decrease. Even in this aspect, it is possible to improve usage convenience.

BRIEF DESCRIPTION OF DRAWINGS

FIG. 2A is an example of a table showing details of information received in a database according to the first embodiment.

FIG. 2B is an example of a table showing details of information received in a database that is a modification example of the first embodiment.

FIG. 3C is an example of words received in a dictionary of a language model that is a modification example of the first embodiment.

FIG. 9C is an example of a table showing importance calculated for combination of morphemes according to the second embodiment.

FIG. 10B is an example of a table showing importance calculated for combination of morphemes according to the second embodiment.

FIG. 13A is a diagram illustrating an example of a vocabulary determining table showing a morpheme belonging to a predetermined attribute according to the third embodiment.

FIG. 13B is a diagram illustrating an example of a table storing a relationship between a subcategory ID number and an ID number of a facility corresponding thereto according to the third embodiment.

FIG. 14 is a diagram illustrating an example of a name database for music search according to a fourth embodiment of the present invention.

FIG. 15 is an example of a screen display according to the fourth embodiment.

FIG. 17 is a diagram illustrating details of a dictionary received in a language model according to the fourth embodiment.

DESCRIPTION OF EMBODIMENTS

Hereinafter, embodiments of the present invention will be described with reference to the accompanying drawings.

First Embodiment

Figure 1:
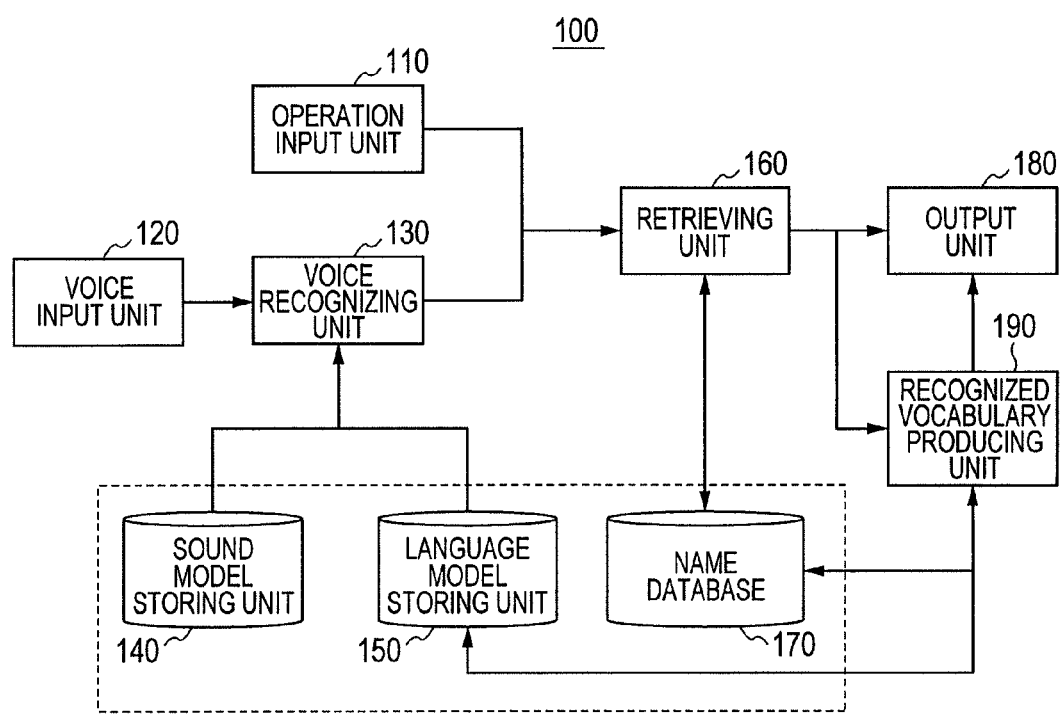
FIG. 1 is a functional block diagram of an information retrieving apparatus according to a first embodiment of the present invention.

An information retrieving apparatus according to a first embodiment of the present invention will be described with reference to FIGS. 1 through 6. FIG. 1 illustrates a functional block of the information retrieving apparatus according to the first embodiment of the present invention.

In the present embodiment, information search for retrieving a facility of a shop and the like in a car navigation system will be described as an example. An information retrieving apparatus 100 has various operation processing functions or image processing functions that are realized by a central processing unit (CPU), a memory, software, and the like. When a configuration of the information retrieving apparatus 100 is divided into functional blocks, the information retrieving apparatus 100 includes, as an input unit, an operation input unit 110 for receiving an operation input of a user and a voice input unit 120 for receiving a voice input of the user. The operation input unit 110 receives an operation input such as a touch panel operation, a remote controller operation, a dial operation, and the like among inputs of the user. Further, the information retrieving apparatus 100 further includes a voice recognizing unit 130 for recognizing voice obtained from the voice input unit as a character string, a sound model storing unit 140 for storing sound data referred by the voice recognizing unit, a language model storing unit 150 for storing a vocabulary recognized by the voice recognizing unit and a connection rule of the vocabulary, a retrieving unit 160, a name database 170, an output unit 180 for providing the user with candidates of a record retrieved by the retrieving unit, a selecting means (not shown) enabling the user to select a predetermined candidate from the provided candidates of the record, and a recognized vocabulary producing unit 190. In addition, a configuration of each constituent element included in the information retrieving apparatus 100 is only an example. Therefore, constituent elements may be integrated with each other, or may be further divided based on a form such as software and the like. For example, the selecting means may be configured as a portion of each function of the operation input unit 110 or the voice input unit 120. Moreover, the sound model storing unit 140, the language model storing unit 150, and the name database 170 are configured as a common memory apparatus.

The name database 170 is a database that registers at least one record as a unit containing at least one attribute to be retrieved and a value associated with the attribute. The value is content about the associated attribute. The retrieving unit 160 retrieves the value of the single attribute or values of plural attributes, included in the name database 170, using an input character string input by the user, and thereby creates, as a candidate, the record in which the input character string is included in the value. The recognized vocabulary producing unit 190 produces an additionally recognized vocabulary that is a voice recognized vocabulary to be newly added to the language model storing unit 150, based on an output of the retrieving unit 160. Through this, the information retrieving apparatus 100 of the present embodiment registers, as the voice recognized vocabulary, the character string input by the user for search, that is, a search query, and enables the registered voice recognized vocabulary to be used for search. Further, the information retrieving apparatus 100 edits the search query based on morpheme information or information of a different database and provides a voice recognized vocabulary that the user may easily speak in the case of voice input. In addition, in the following embodiment, an example in which the user performs voice input in English will be described. Hereinafter, a configuration and a function of each constituent element will be described in detail.

[Description of Name Database: 1]

The name database 170 is a database that accumulates data retrievable by the information retrieving apparatus. In the present embodiment, it is described that information about a facility of a car navigation system is received.

FIG. 2A illustrates a configuration example of a table of the name database 170. Further, in the present invention, a unit of each data is referred to as a record.

The name database 170 stores facility names (names) throughout the whole country (country or region using car navigation system) registered to the car navigation system. Information about plural attributes is assigned to a single record. Further, information stored in each attribute is referred to as a value.

A name 210 indicates each facility name.

Reading 220 assigns "Yomigana" to each facility. Further, reading of a facility name is separated using a symbol "/". Each separated part is referred to as a morpheme. In addition, a word class describing a corresponding property is provided based on each morpheme. A method of performing the morpheme separation will be described below.

[Morpheme Interpretation Method]

Here, a morpheme separation method will be described.

[Type of Word Class]

A morpheme is a single vocabulary unit defined by a natural language. However, in the present embodiment, the morpheme is defined as a unit in which a facility name is separated at a separation convenient location. Further, in the case of a language in which each word is separated and thereby is indicated, such as English, a word separation location may be used as a separation location of the morpheme. The morpheme may be separated based on a separation location of a compound noun within a word or a location where use occurs, as well as the word separation location.

Definition of the morpheme is different for each language. Separation of a facility name will be described with reference to the present embodiment. As a morpheme system for the above operation, a meaning category when separating a facility name, which is disclosed in the known document (Iwase Shigehito: Method of interpreting a company name using natural language processing, electronic information technology academy paper, vol. J 82-DII, no. 8, pp. 1305-1314, 1999) may be used as a unit of the morpheme. By referring to the paper by "Iwase", the present embodiment of the present specification considers three types, "specific name", "place name", and "category of business" as word classes. Further, "others" that do not belong to any of the above three types will be described.

Further, even though an embodiment relating to music search will be described, a method of employing an existing word class system of a language corresponding to a country or a region using the music search may be applied to a music title. In addition, a method of separating a name based on a unit such as a "first name" and a "second name" and considering each as a morpheme may be applied to names of a lyric writer, a composer, and an artist.

[Separation Method]

Various methods may be employed as the morpheme separation method.

As the first method, it is possible to perform a configuration of assigning a morpheme separation location of each name and a word class of each morpheme in the name database from the beginning.

As the second method, it is possible to dynamically perform morpheme separation processing. For example, as a morpheme interpretation method, it is possible to separate the facility name based on a morpheme unit by having a relationship between each morpheme and a word class as a dictionary and by employing a method such as a maximum length matching method, a separation number minimizing method, and an access cost minimizing method.

[Use of Dictionary for Voice Mixing]

Further, it is possible to perform morpheme separation using information about a dictionary for voice mixing. The car navigation system includes information about reading of each name in order to read out the facility name, the music title, or other information using voice guidance. In addition, accent information, rhythm information, and morpheme separation information required for natural reading is assigned for each reading. The information may be used as a morpheme separation unit of the present invention

[Description of Name Database: 2]

The name database 170 will be further described by referring again to FIG. 2A.

A main category 230 stores a category belonged by each facility.

A subcategory 235 stores a further detailed category than the main category 230 belonged by each facility. For example, the subcategory 235 stores a line name with respect to a railroad station and stores a name of a chain or an administration headquarter belonged by each facility with respect to a supermarket.

An address 240 stores an address of each facility.

An additionally recognized vocabulary 250 registers a voice recognized vocabulary in order to designate each facility. This registration method will be described below.

Further, even though not illustrated in FIG. 2A, attributes such as latitude, longitude, and a map code generally used in the car navigation system are also stored in the name database 170.

[Description of Configuration]

A configuration of the information retrieving apparatus 100 will be described by referring again to FIG. 1.

The operation input unit 110 receives an input of a manual operation such as a touch panel, a remote controller, a dial, and the like, among user inputs.

The voice input unit 120 receives an input by voice of the user. Specifically, the voice input unit 120 converts, to a digital signal, voice spoken by the user input via a microphone.

The voice recognizing unit 130 recognizes the voice from the converted digital signal of voice and converts the recognized voice to a character string. Here, the voice recognizing unit 130 initially converts voice data spoken by the user to a predetermined vector column. The predetermined vector column indicates a feature amount of each time of voice as a multidimensional vector amount, and arranges the feature amount on time series. For example, voice data of each time that is converted to the multidimensional vector amount called a Mel frequency cepstrum coefficient (MFCC) parameter and is arranged on time series is used.

The sound model storing unit 140 stores a model corresponding to each phoneme. As an expression form of the model, a hidden Markov model (HMM) that defines each phoneme as three states may be used.

The language model storing unit 150 stores a word to be recognized by the voice recognizing unit and a connection rule of each word.

[Language Model]

Details of the language model storing unit 150 will be described with reference to FIGS. 3A and 3B.

Here, the language model is provided to be capable of recognizing the reading 220 of each facility in the name database 170.

Figures 3A, 3B:
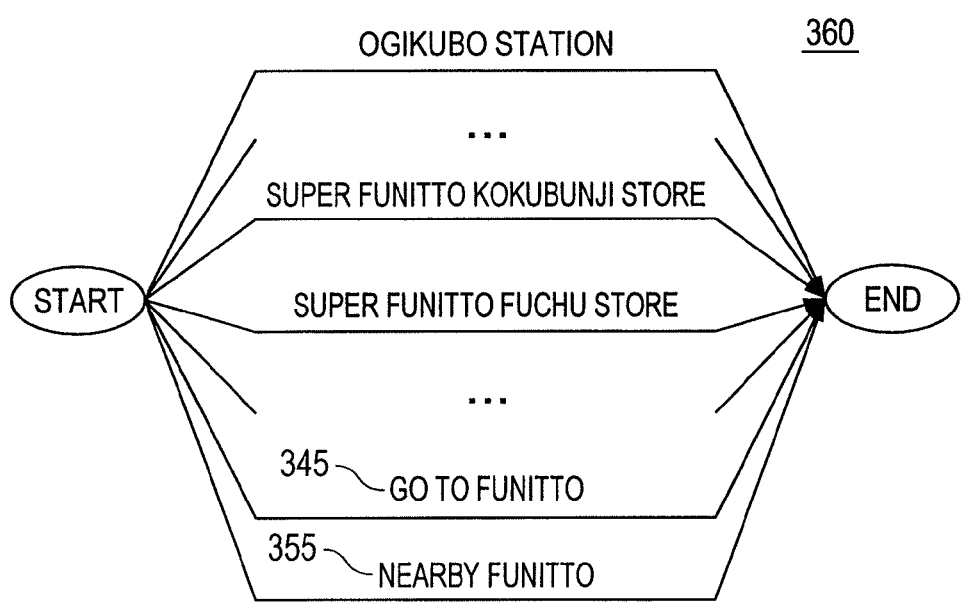
FIG. 3A is an example of words received in a dictionary of a language model according to the first embodiment.
FIG. 3B is a diagram illustrating a connection rule of a recognizable word in the language model of FIG. 3A.

FIG. 3A illustrates a dictionary 300 in which a word that is a unit to be recognized in the language model is registered. Here, the reading 220 of each facility in the name database 170 is registered as a word.

Information about a single word is configured by two attributes including a word label 310 and a phoneme string 320.

The word label 310 stores character string information that is output as the voice recognition result.

The phoneme string 320 stores a phonetic symbol corresponding to a reading method of each word. Correspondence between a phonetic symbol and an actual phoneme in the dictionary 300 of FIG. 3A follows a format by the "Japanese Dictation Basic Software" developed through the project of the Information-Technology Programming Agency (IPA) of Japan, which is disclosed in the following documents.

Shikano, Ito, Kawahara, Takeda, Yamamoto: "Voice Recognizing System", page 133 of Ohmsha (2001).

Shikano, Takeda, Kawahara, Ito, Yamada, Ito, Utsuro, Kobayashi, Sagayama, Minematsu, Yamamoto: "Development of Basic Japanese Dictation Software", 19 IPA technology presentation paper (2000) (http://www.ipa.go.jp/SYMPO/sympo2000/pdf/ipa19_1_51_1, pdf).

Further, as a phonetic symbol corresponding to a language excluding Japanese, for example, an extended SAM phonetic alphabet (X-SAMPA) may be used.

FIG. 3B is a diagram illustrating a connection rule 360 of a recognizable word in the language model.

All of the paths from symbol "start" to "end" indicate to be recognizable. Here, an example of a finite state grammar capable of recognizing each word registered to a dictionary is shown. Grammar paths 345 and 355 corresponding to words 340 and 350 that are added to the dictionary 300 of FIG. 3A are added to the connection rule 360 of FIG. 3B. This aspect will be described in detail below.

Further, as shown as a modification example in FIG. 3C, the dictionary 300 of the language model storing unit 150 may include a corresponding ID number 330 as the third attribute. An ID number 205 of the name database corresponding to each word is registered to the corresponding ID number 330. The dictionary 300 of FIG. 3C is combined with the table 170 of FIG. 2B and thereby used. The use method will be described below as a modification example of the first embodiment.

[Voice Recognizing Unit]

The voice recognizing unit 130 compares a feature vector column of input voice with a phonetic system of a recognizable word string stored in the language model, and thereby calculates sores indicating a matching level therebetween.

The voice recognizing unit 130 outputs a character string of a word label of a word string having the highest scores.

Here, the voice recognizing unit 130 may output only the word string having the highest scores, and may further output plural word strings whose scores are in upper rankings.

Further, the voice recognizing method is described in detail in the following documents, and may be used for actual performance.

Lee, Reddy: "Automatic Speech Recognition: The Development of the Sphinx Recognition System", Kluwer Academic Publishers (1989)

Rabiner, Juang: "Fundamentals of Speech Recognition", Prentice Hall PTR (1993)

[Retrieving Unit]

The retrieving unit 160 performs search from among values of the respective attributes stored in the name database 170 using the character string output from the voice input unit 120 or the voice recognizing unit 130, and creates a selection candidate of the record.

[General Flow of Candidate Creation by Text Input and Voice Input]

Figure 4:
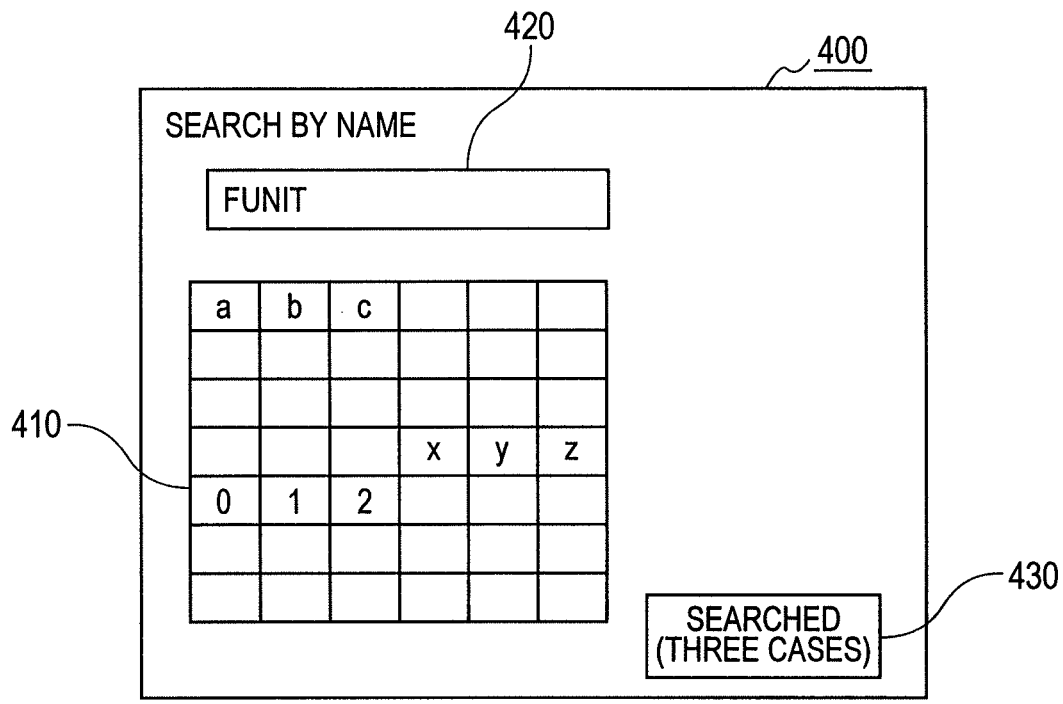
FIG. 4 is a diagram illustrating an example of a touch panel and a screen display of the touch panel according to the first embodiment.

Here, a flow of creating, by the retrieving unit 160, a selection candidate through a user input will be illustrated FIG. 4 illustrates an example of a touch panel 400 mounted on a screen of a car navigation system and a display thereof. The touch panel 400 includes a graphical user interface (GUI) function, and includes each of functions of the operation input unit 110, the retrieving unit 160, and the output unit 180. The touch panel 400 further includes a function of a selecting means that selects a predetermined candidate from a candidate list of a record output from the output unit. Here, description will be made based on an example of retrieving a facility by a character input.

A character button 410 may input a character by pressing each button. Further, a button for performing a character deletion, change of an input character type, and a cursor movement is provided.

A character string pressed by the user using the character button 410 is displayed on a display area 420.

A search button 430 is a button to be pressed when the user desires to view details of selection candidates. Further, every time the user updates the character string by pressing the character button 410, the number of obtained selection candidates by the retrieving unit 160 is indicated within brackets.

Here, as an example, it is assumed that the user inputs "funit".

The input is transferred to the retrieving unit 160 via the operation input unit 110.

The retrieving unit 160 retrieves a value of the reading 220 from the attributes of the name database 170 and retrieves a record including the user input character string "funit".

Further, considering the input convenience of the user, a small character included in a syllabic nasal, a contracted sound, and the like may be retrieved even using a corresponding large character. In addition, a voiced consonant and a p-sound in Kana syllabary may be retrieved regardless of whether those sound exist.

As the search result, three selection candidates "super Funitto Kokubunji store", "super Funitto Fuchu store", and "Funitsuru hotel" are obtained.

In addition, it is assumed that the user has pressed the search button 430 by selecting a selection candidate using the function of the selecting means of the touch panel 400.

Facility candidates are transmitted to the output unit 180 through the pressing operation of the selecting means.

The output unit 180 changes a screen display to provide the user with the selected candidate, or plays back voice transferring the selected candidate to the user using voice.

Figure 5:
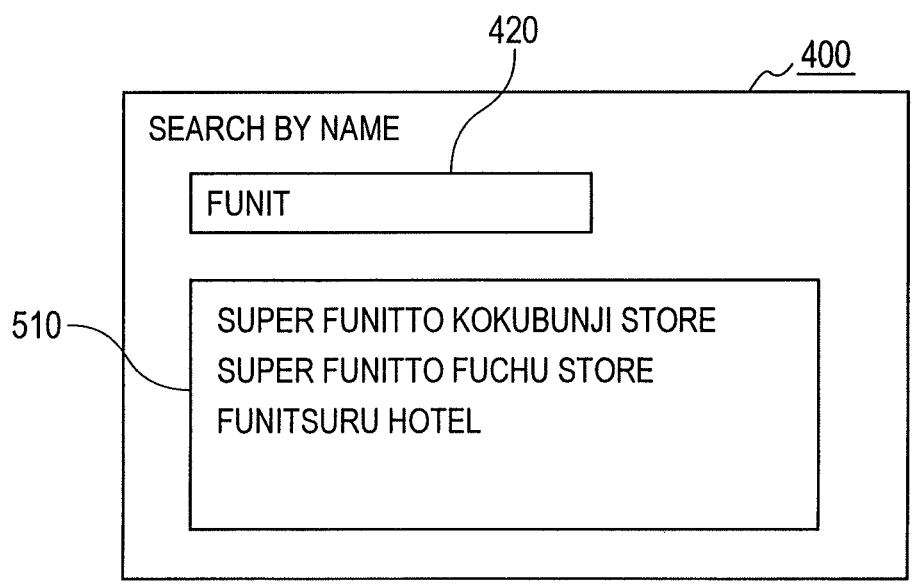
FIG. 5 is a diagram illustrating an example of a display changed screen due to an input operation of a user.

The screen of the touch panel 400 changed by the output unit 180 is shown in FIG. 5. Created selection candidates are displayed on a candidate display area 510.

After viewing the selection candidates, the user selects, from among the selection candidates, a single facility that the user desires to visit and presses the corresponding facility displayed on the candidate display area 510 using the function of the selection means of the touch panel 400. The pressing result of the selection means is received via the operation input unit 110. Accordingly, for example, when the user selects "super Funitto Fuchu store", a predetermined operation of the car navigation system such as a route search or a map display is executed by employing the selected facility as the search result.

Next, an operation in a case where the user uses a voice input function as the selecting means will be described.

It is assumed that the user has spoken "super funitto Fuchu store" by voice input. The voice is converted to a digital signal by the voice input unit 120 and then, is converted to a character string by the voice recognizing unit 130.

In the case of voice recognition processing, the most similar voice signal is retrieved from a word string to be recognized stored in the language model storing unit 150. As a result, it is assumed that "super Funitto Fuchu store" is output.

The selection result of the user using the selecting means is input to the retrieving unit 160.

The retrieving unit 160 compares the voice recognition result "super funitto Fuchu store" and the reading 220 of the name database 170 and thereby retrieves a completely matching facility. As a result, the facility "super Funitto Fuchu store" is selected. Next, the selected facility is output from the output unit 180. In this case, the candidate is only one and thus, a predetermined operation of the car navigation system such as a route search or a map display is executed.

To further accelerate a search rate, as shown in FIGS. 2B and 3C, a method of employing an ID number uniquely assigned to each facility is used as the modification example of the first embodiment. That is, FIG. 2B illustrates a configuration example of the table 170 as the modification example of the name database. In this example, the ID number 205 indicating the ID number uniquely assigned to each facility is added as an attribute. Instead, an item of the additionally recognized vocabulary 250 of the name database 170 is omitted. Further, as shown in FIG. 3C, in addition to the word label 310 and the phoneme string 320, the ID number 205 of the record corresponding to each word is stored as information of each word included in the dictionary 300 of the language model. It is stored in the corresponding ID number 330 of FIG. 3C. For example, as the corresponding ID number, an ID number "0201" of a corresponding record in the name database 170 is stored in the word "super Funitto Fuchu store".

Further, when outputting the voice recognition result, the voice recognizing unit 130 also outputs the corresponding ID number 330 of the recognized word in addition to the word label. By referring to the corresponding ID number 330 assigned to the recognized word in the output of the voice recognizing unit 130, the retrieving unit 160 creates, as a candidate, the record including the same ID number "0201" in the name database 170. Consequently, the facility "super Funitto Fuchu store" may be created as the candidate.

[Search Method]

A method of performing, by the aforementioned retrieving unit 160, actual search will be described.

Initially, a case where an input that is a search query is an input via the touch panel 400 and the like, and a character string that is obtained from the operation input unit 110 will be described.

As the first method of performing search, there is the whole case search. This method compares a character string obtained from the operation input unit 110 with all of the readings 220 of attributes of the name database 170, and retrieves a record that partially matches the input character string. However, in the case of processing the whole case search, the number of comparison operations increases and thus, a processing rate decreases.

As the second search method in which the above processing is accelerated, search using an index used for database search may be applied. Initially, an index storing a relationship between the input character string and information (for example, the ID number 205 of the name database 170 of FIG. 2B, an address indicating a storage location of a record in a storage apparatus, and the like) particularly determining a corresponding record is prepared. Then, when the user inputs characters, that is, a query for search, a list of corresponding records may be immediately obtained by referring to the index using an input character string as a key. In addition, the known technology used for database search may be used.

Next, a case where an input that is a search query is a voice input and a character string is obtained from the voice recognizing unit 130 will be described.

Even when the input is by voice, a character string is input to the retrieving unit 160 and thus, search may be performed using the same method as the method used in the input via the touch panel and the like. That is, the whole case search method of comparing the input character string with all of the readings 220 of the name database 170 may be employed. Further, it is possible to employ a method of obtaining a facility candidate by preparing the index storing relationship between all of probable character strings obtained from the voice recognizing unit 130 and information (for example, the ID number 205 of the name database 170 of FIG. 2B, an address indicating a storage location of a record in a storage apparatus, and the like) particularly determining a record corresponding to each character string, and the like, and by referring to the index using the voice recognition result as a key.

Processing of search using the voice recognition result or the touch panel input according to the present invention may be performed by the search processing methods.

[Various Performances of Voice Recognition]

The description relating to the first embodiment and the modification example thereof is made by considering a case where a single word string is input as the voice recognition result. However, in voice recognition processing, it is possible to obtain plural word strings. Therefore, when plural word strings of voice recognition is obtained, a facility name including any one word string or word among the obtained plurality of word strings may be retrieved and the result may be output.

Further, the description relating to the first embodiment and the modification example thereof is made by considering a case where the voice recognition result completely matches the reading 220 of a single facility of the name database 170. In addition, like the connection rule 360 of FIG. 3B, in a grammar of the language model storing unit 150, a reading of each facility is stored in parallel. Meanwhile, the language model may store a word based on a unit in which a facility name is further separated and may combine and thereby use it with a grammar assigning a connection probability such as an N-gram language model. In this case, a character string of a portion of the facility name may be obtained. Therefore, the retrieving unit 160 creates, as a candidate, a record in which the character string of the recognition result is included (partially matching) in the reading 220 of the facility name and may use the result as the candidate.

[Assumption of First Embodiment]

Hereinafter, the present embodiment describes an operation of the recognized vocabulary producing unit 190 in a case where the user inputs "funit" via the touch panel, and three candidates, "super Funitto Kokubunji store", "super Funitto Fuchu store", and "Funitsuru hotel" are obtained as the search result, and the user selects "super Funitto Fuchu store".

[Recognized Vocabulary Producing Unit]

Figure 6:
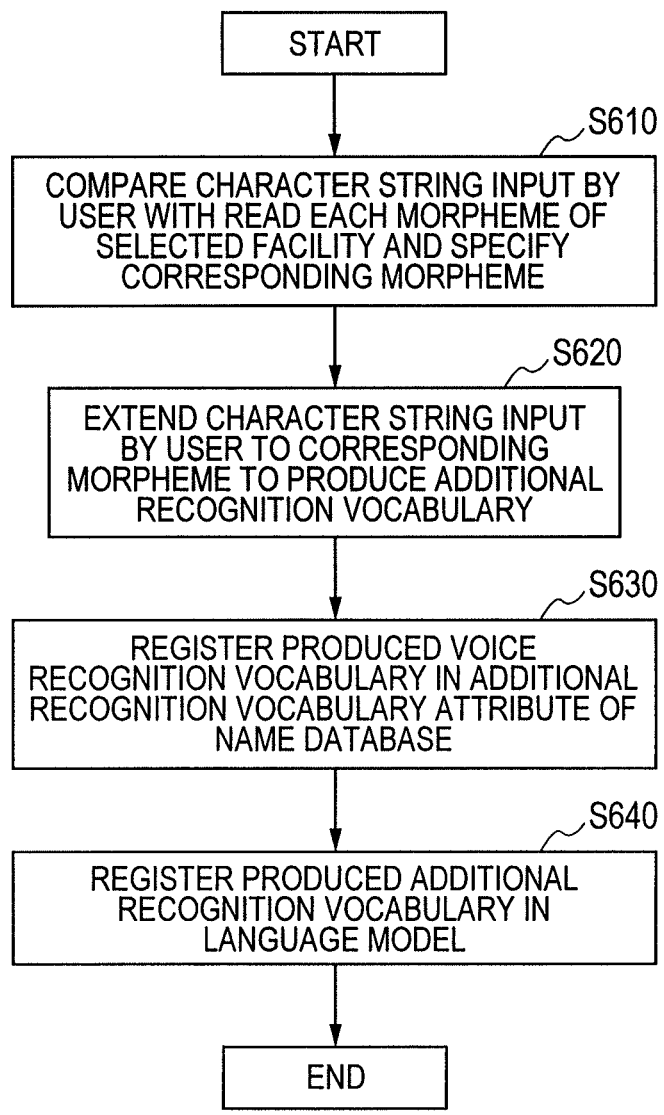
FIG. 6 is a flowchart illustrating a processing order of a recognized vocabulary producing unit according to the first embodiment.

FIG. 6 illustrates a processing flow of the recognized vocabulary producing unit 190.

In step 610, a character string "funit" input by a user is compared with reading of a determined facility "super Funitto Fuchu store" based on a morpheme unit.

As a result, it can be known that the user input character string "funit" is a portion of the morpheme "funitto" within the reading "super/Funitto/Fuchu/store".

In step 620, the user input character string is edited based on the morpheme. Here, the character string "funit" input by the user is extended to the corresponding morpheme and is edited as "Funitto".

The edited "funitto" is used as a voice recognized vocabulary.

In step 630, the voice recognized vocabulary produced in step 620 is registered to the additionally recognized vocabulary 250 of the facility "super Funitto Fuchu store" of the name database 170 selected by the user. Here, the registered voice recognized vocabulary may be connected to a vocabulary such as "go to ~" and "take me ~" so that the user may easily speak. Here, "go to ~" may be connected.

A method of adding "go to ~" is shown in 260 of the name database 170 of FIG. 2A.

In step 640, a word is registered to the language model storing unit 150 based on the vocabulary registered to the additionally recognized vocabulary 250. Here, a pair of phoneme strings indicating reading "go to funitto" and a pronunciation thereof are registered to the dictionary 300 of the language model storing unit 150 (340 of FIG. 3A). Further, a grammar path corresponding to the word added to the dictionary is added to the grammar (connection rule) 360 (345 of FIG. 3B).

Further, in the case of the modification example, in the word added to the dictionary 300, "0201" that is the ID number 205 of the facility "super Funitto Fuchu store" selected by the user is registered to the corresponding ID number 330. That is, each vocabulary stored in the language model storing unit 150 is stored together with a corresponding ID (ID number 330). The voice recognizing unit 130 also outputs the ID corresponding to the recognized vocabulary together with the recognized vocabulary. By referring to the ID assigned to the vocabulary output by the voice recognizing unit, the retrieving unit 160 creates a record including the same ID in the name database 170 as a candidate. Accordingly, the recognized vocabulary producing unit 190 produces the additionally recognized vocabulary based on the output of the retrieving unit 160 in step 620 of FIG. 6, omits registration to the name database 170 in step 630, and proceeds to step 640 and thereby adds the vocabulary to the dictionary 300 of the language model storing unit 150 in a form of combining the corresponding ID number corresponding to the record selected by the user in the name database 170 and the produced additionally recognized vocabulary in step 640.

Further, it is possible to register and manage a flag indicating that "go to Funitto" is the additionally recognized vocabulary.

[Setting of Destination Using Additionally Recognized Vocabulary]

The subsequent operation in the first embodiment will be described.

The user speaks "go to funitto" by voice.

As a result, voice recognition processing is performed by the voice recognizing unit 130 via the voice input unit 120.

As the voice recognition processing result, a word label "go to funitto" of the voice recognition result is obtained.

Next, the retrieving unit 160 compares the word label of the voice recognition result with the name database 170.

Here, in addition to the reading 220 of the name database 170, comparison with the additionally recognized vocabulary 250 is also performed. As a result, the word label matches the additionally recognized vocabulary "go to Funitto" 260 of the facility "super Funitto Fuchu store".

Based on the result, the output unit starts a voice response saying "the destination is set as "super Funitto Fuchu store", and a predetermined operation of the car navigation system such as a map display and a route search is executed.

Further, in the case of the modification example, the processing order of selecting the facility "super Funitto Fuchu store" from speaking "go to funitto" of the user is performed by omitting processing of comparing the reading 220 of the name database 170 with the additionally recognized vocabulary 250 using the corresponding ID number 330 assigned to the language model storing unit. Specifically, as the voice recognition result, the voice recognizing unit also outputs the corresponding ID number "0201" in addition to the word label "go to "Funitto". By referring to the corresponding ID number "0201" in the voice recognition result, the retrieving unit 160 creates, as a candidate, a matching facility in the ID number 205 of the name database 170. Even in the method, the facility "super Funitto Fuchu store" may be selected as the candidate.

[Another Example of Recognized Vocabulary Producing Unit]

Next, in the first embodiment, an operation of the recognized vocabulary producing unit 190 in a case where the user selects "Funitsuru hotel" from the candidate display area 510 of FIG. 5 will be described.

In this case, a morpheme matching the user input character string is "funitsuru". Therefore, a vocabulary "go to Funitsuru" is created with respect to "Funitsuru hotel" and is registered to the additionally recognized vocabulary 250 of the name database 170 and the language model storing unit 150. Accordingly, when the user speaks "go to funitsuru", a predetermined operation about "Funitsuru hotel" is performed.

As described above, in the present embodiment, the voice recognized vocabulary is added based on the character string input by the user via a touch panel and the like. Through this, from the beginning, the user may use a vocabulary which the user is aware of for voice recognition. Therefore, it is possible to decrease a frequency of a vocabulary excluding speech and to improve usage convenience.

Further, in the present embodiment, the character string input by the user is extended using morpheme separation. Through this, even though the character string input by the user via the touch panel is incomplete such as "funit", it is possible to extend the character string up to a unit in which the user feels natural to speak by extending the character string based on a morpheme unit. However, unlike the present embodiment, it is possible to use the character string input by the user as the additionally recognized vocabulary without processing.

[When "Japanese-Syllabary Chinese Character" Input is Allowed]

Further, the present embodiment considers that a character input by the user via the touch panel is "Japanese-syllabary character". However, mixed characters of "Chinese character" and "Japanese-syllabary" may also be input. In this case, each name may be separated into morphemes with respect, to the name 210 of the name database (for example, "Ogikubo (Chinese character)/station (Japanese-syllabary)"). During processing of step 610, a "Japanese-syllabary Chinese character" mixed character string input by the user is compared with the name 210 of the facility and the corresponding morpheme is particularly determined. Through this, it is possible to cope with the "Japanese-syllabary" and "Chinese character" mixed input of the user.

[Search of Additionally Recognized Vocabulary Using Touch Panel Input]

Further, the present embodiment employs an embodiment of processing characters input by the user via the touch panel and using the processed characters as a voice recognized vocabulary. However, the produced voice recognized vocabulary may be used as a word to be retrieved even in an input of an operation using a general touch panel and the like as well as voice recognition.

For example, it is assumed that, with respect to the facility "super Funitto Fuchu store" of the name database, "Funitto" is already added to the additionally recognized vocabulary attribute. In this circumstance, it is assumed that the user inputs "funitto" via the touch panel. In this case, the retrieving unit searches the reading 220 of the name database and creates, as candidates, facilities including "funitto" in the reading.

Here, the additionally recognized vocabulary attribute of the name database 170 matches the additionally recognized vocabulary attribute of the facility "super Funitto Fuchu store". Based on the above determination, to provide the user with "super Funitto Fuchu store" rather than other candidates may be considered.

For example, a method of displaying "super Funitto Fuchu store" on the top of the candidate display area 510 in the screen display even through hundreds of candidates exist with respect to the search query "funitto" may be considered. Accordingly, the user may immediately find the facility that the user is aware of.

Second Embodiment

An information retrieving apparatus according to a second embodiment of the present invention will be described with reference to FIG. 1, FIG. 2A, and FIGS. 7A through 10B.

The present embodiment produces plural additionally recognized vocabulary candidates with respect to the facility selected by the user in the first embodiment, and enables the user to select the facility from among the plural additionally recognized vocabulary candidates.

Further, when an additionally recognized vocabulary is already used for voice recognition, or when a similar recognized vocabulary exists, an operation for the addition is changed.

In addition, even though the ID number described above in the first embodiment is not used, configurations of the name database 170, the language model storing unit 150, the dictionary 300, and the like may be realized by applying a method of using the ID number described above in the modification example of the first embodiment.

[Assumption of Second Embodiment]

For description of the present embodiment, it is initially assumed that "go to super Funitto" is added to the facility "super Funitto Kokubunji store" as the additionally recognized vocabulary 250 in the name database 170 (282 of FIG. 2A). Therefore, it is assumed that the vocabulary "go to super Funitto" is also registered to the language model storing unit 150.

Hereinafter, it is assumed that the user inputs "funit" via the touch panel and selects "super Funitto Fuchu store" from among facility name candidates.

[Morpheme Importance]

Next, an example of applying morpheme importance to a morpheme will be described.

Figure 7A:
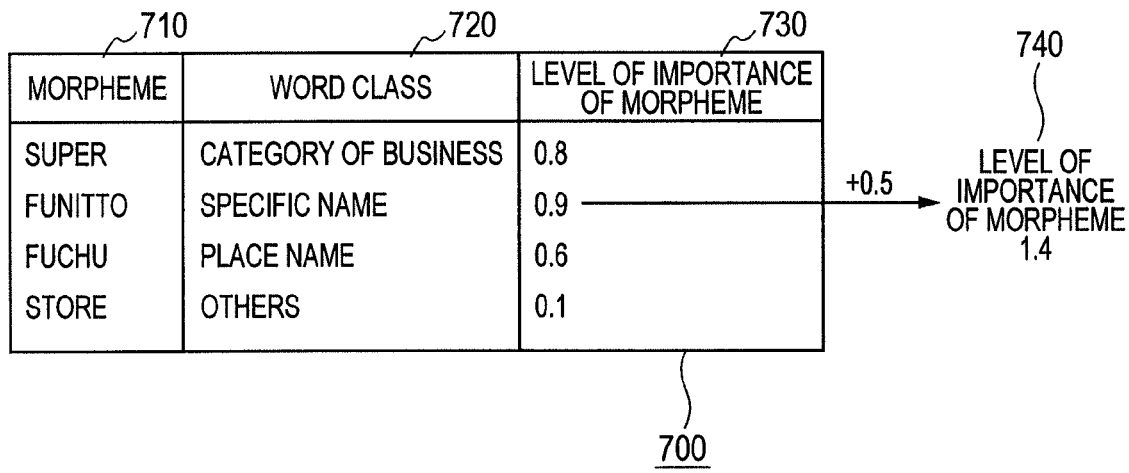
FIG. 7A is an example of a table showing importance of a morpheme according to a second embodiment of the present invention.
Figure 7B:
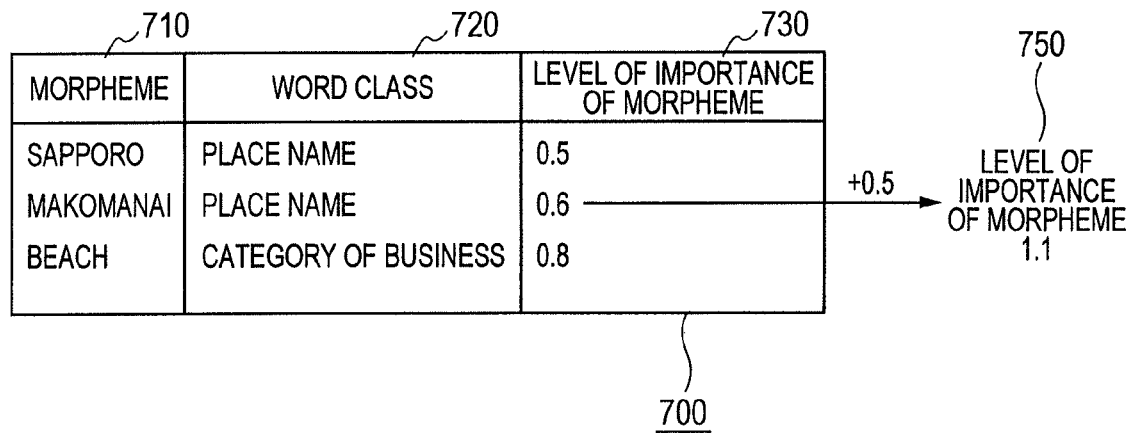
FIG. 7B is another example of a table showing importance of a morpheme according to the second embodiment.

Each of FIGS. 7A and 7B is an example of a table 700 defining the morpheme importance according to the present embodiment.

As shown in FIG. 7A, the table 700 defining morpheme importance 730 of each morpheme 710 included in "super Funitto Fuchu store" is prepared. The morpheme importance is defined as an index that is set to increase in a case where the user naturally calls the corresponding facility by speaking the morpheme. For example, to designate the name "super Funitto Fuchu store" by speaking the morpheme "funitto" is considered to be natural and thus, the corresponding morpheme importance is set to be high. Meanwhile, to designate the facility using only the morpheme "store" barely exists and thus, the morpheme importance of "store" is set to be low.

Further, instead of using the morpheme 710, the morpheme importance may be provided by employing a value defined for each word class 720. In this case, values of "specific name", "place name", and "category of business" may be set to be high, and values of "others" may be set to be low. In "others", for example, company type names ("Incorporated company", "Foundation", and the like) are included.

Further, instead of using continuous values, the morpheme importance may use quantized values. For example, any one piece of information between two steps such as "importance" and "unimportance" may be assigned. In addition, even though not illustrated, the morpheme importance may be assigned with respect to plural combinations of morphemes. For example, when a combination "super/Fuchu" in which "Funitto" is omitted is natural on a user side, it is possible to increase the morpheme importance of the combination.

[Operation of Recognized Vocabulary Producing Unit]

Next, a processing flow of the recognized vocabulary producing unit 190 according to the present embodiment will be described with reference to FIG. 8.

[Addition of Morpheme Importance Corresponding to Character String Input by User]

In step 810, a morpheme of reading including a character string input by a user is particularly determined. As a result, the morpheme "funitto" is particularly determined as the character string input by the user. Next, recalculation is performed to increase the importance of the above morpheme. In the present embodiment, 0.5 is added. Therefore, as shown in 740 of FIG. 7A, the morpheme importance of the morpheme "funitto" becomes 1.4.

[Creation of Voice Recognized Vocabulary Using Combination of Morphemes]

In step 820, a combination of morphemes of the facility is created as a candidate of a voice recognized vocabulary. Further, the combination importance of the above combination is calculated. The combination importance means importance is assigned such that the higher the combination importance, the more the user naturally speaks the corresponding combination of morphemes. Various methods may be used as the calculation method. Here, the average obtained by summing the morpheme importance and then dividing the summation result by the number of morphemes is used as the combination importance.

Figures 9A, 9B:
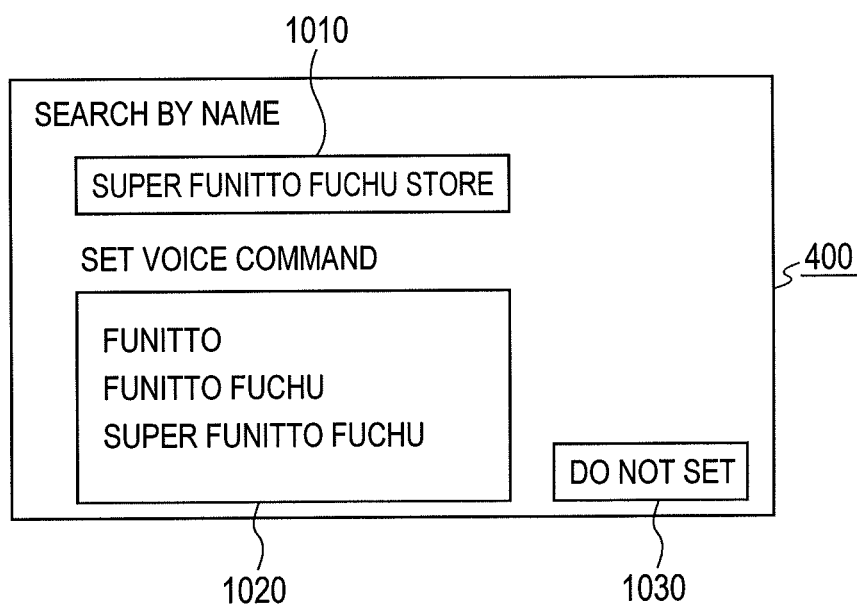
FIG. 9A is an example of importance calculated for combination of morphemes according to the second embodiment.
FIG. 9B is a diagram illustrating an example of a display changed screen due to an input operation of a user according to the second embodiment.

A table 900 of FIG. 9A illustrates an example of the combination importance calculated in step 820. A morpheme combination 910 is each combination of morphemes. A combination importance 920 is a combination importance calculated with respect to each combination of morphemes. Further, the combination importance 920 is sorted in a descending order.

For example, in the case of the morpheme combination "super/funitto", the morpheme importance of "super" is 0.8 and the morpheme importance of "funitto" is 1.4. Therefore, 1.1 is calculated by summing the morpheme importance and by dividing the summation result by the number of morphemes "2".

[Decrease of Importance of Combination Similar to Existing Voice Recognized Vocabulary]

In an operation of step 825, a similarity between each created morpheme combination and a word stored in the language model storing unit is calculated. Here, in a state of excluding a vocabulary added by the recognized vocabulary producing unit such as "go to ~", if completely matching, the similarity is calculated as "1" and if not matching, the similarity is calculated as "0". Further, instead of using this method, continuous values may be employed using a distance between phonemes of a word, and the like. The distance between phonemes may be calculated using a known method such as an edited distance of a phonetic symbol, a Bhattacharyya distance, and the like.

The calculation result as described above is provided as a similarity 930 of the table 900 of FIG. 9A. The voice recognized vocabulary "go to super Funitto" is already used with respect to "super Funitto Kokubunji store" (282 of FIG. 2A). Accordingly, since "go to super Funitto" is already present in the language model, the calculation becomes 1 with respect to the morpheme combination "super/funitto" and becomes 0 with respect to other combinations.

Based on the above result, when the similarity is high, recalculation is performed to decrease the combination importance. Here, as an example, when the similarity is "1", the combination importance is "0". Through this, the combination importance with respect to the morpheme combination "super/funitto" becomes "0" (Operation of 940 of the table 900 of FIG. 9A).

[Providing Candidates of Voice Recognized Vocabulary and User Selection]

In an operation of step 830, the voice recognized producing unit 190 considers, as candidates of the additionally recognized vocabulary, plural morpheme combinations 910 whose combination importance 920 ranks in an upper portion, and outputs the candidates to the output unit 180. Here, top three candidates are output.

Based on this, the output unit updates a screen display. FIG. 9B illustrates the updated display screen 400. The purpose of this screen is to request the user to select the additionally recognized vocabulary from among candidates of the additionally recognized vocabulary candidates.

A name of the facility selected by the user is displayed on a selected facility display area 1010.

The additionally recognized vocabulary candidates output from the recognized vocabulary producing unit 190 are displayed on an additionally recognized vocabulary candidate display area 1020. Further, to have a good visibility on a user side, the additionally recognized vocabulary candidates are displayed using "Japanese-syllabary Chinese character" mixing that is a base of the additionally recognized vocabulary.

Through the display, the user selects the additionally recognized vocabulary from among the additionally recognized vocabulary displayed on the additionally recognized vocabulary candidate display area 1020. For the above operation, a voice command such as "super Funitto Fuchu store" is set as a voice output. A guidance "please select on the screen" may be played back.

A case where the user selects "Funitto Fuchu" from thereamong will be described.

Since the user selects the voice recognized vocabulary according to a conditional equation of step 840, processing proceeds to step 850.

In step 850, the selected "Funitto Fuchu" is registered to the additionally recognized vocabulary 250 of "super Funitto Fuchu store" of the name database 170. Here, similar to the first embodiment, "go to Funitto Fuchu" is added in a form in which "go to ~" is assigned. The processing is shown as 270 of the name database 170 of FIG. 2A.

In step 860, the word "go to Funitto Fuchu" is added to the language model storing unit 150.

Next, similar to the first embodiment, the user may execute a predetermined operation corresponding to the facility "super Funitto Fuchu store" by speaking "go to Funitto Fuchu".

[Providing Voice Recognized Vocabulary Candidates and when User Selects None]

Meanwhile, description about the processing will be added by referring again to displaying of the voice recognized vocabulary in step 830. The user may not desire to use any of the displayed voice recognized vocabulary candidates. To address the situation, a setting refusal button 1030 is provided on the screen 400 of FIG. 9B.

When the user presses the setting refusal button 1030, the user does not select the voice recognized vocabulary according to the conditional equation of step 840 and thus, the processing is terminated. Accordingly, any of the displayed voice recognized vocabulary candidates is not employed.

As described above, by creating plural additionally recognized vocabulary candidates and by enabling the user to select the additionally recognized vocabulary from among the candidates, the user may set a destination using the user's desired vocabulary. Further, by providing an operation method of not using the vocabulary, it is possible to prevent a vocabulary undesired by the user from being added.

Further, when creating the additionally recognized vocabulary, it is possible to provide the user with a more easily available voice recognized vocabulary by creating the combination based on the morpheme importance.

In addition, with respect to the morpheme importance, by increasing the importance of a morpheme corresponding to a character string input by the user, the additionally recognized vocabulary including the morpheme input by the user may be easily displayed.

[Exclusion of similar phonetic vocabulary causing Recognition Error]

Further, as described in the present embodiment, by excluding in advance, from candidates, the existing vocabulary present in the language model, it is possible to prevent plural facilities from being designated as predetermined similar vocabularies.

In the present embodiment, a case where when the vocabulary completely matches the existing vocabulary, the corresponding vocabulary is excluded from the additionally recognized vocabulary candidates is described as an example. However, the following example may also be performed.

Initially, a vocabulary not completely matching, however, significantly similar to an existing vocabulary may be present as the additionally recognized vocabulary. For example, in a state where the additionally recognized vocabulary "go to Funitsuru" is already present in "Funitsuru hotel", "go to Funitto" may appear as a candidate of the additionally recognized vocabulary for "super Funitto Fuchu store". Phonemes of the vocabularies "Funitsuru" and "Funitto" are similar to each other and thus, may be considered as a pair that may be easily erroneously recognized with respect to each other. In this case, an operation of calculating the similarity as continuous values according to the method based on the distance between phonemes in the similarity calculation between vocabularies in step 825, and excluding the corresponding vocabulary from the candidates by decreasing the corresponding combination importance when the similarity is greater than a predetermined threshold may be performed. By employing the above method, it is possible to exclude the additionally recognized vocabulary "Funitto" from the candidates. Therefore, by excluding in advance a highly similar vocabulary from the additionally recognized vocabulary, it is possible to prevent the recognition error.

[Calculation of Similarity with Vocabulary Excluding Additionally Recognized Vocabulary]

Further, the present embodiment describes processing of comparing a vocabulary with the already added additionally recognized vocabulary among the existing vocabularies present in the language model, and excluding the vocabulary from candidates when there is a similar vocabulary as the comparison result. However, there is a case where the existing vocabulary is not the additionally recognized vocabulary. For example, from the beginning, the car navigation system may perform comparison with a recognizable formal name of a facility or a voice command of the car navigation system and thereby exclude an additionally recognized vocabulary candidate from candidates when the additionally recognized vocabulary candidate is similar thereto.

[Inquiry to User when Additional Vocabulary is Similar]

Further, when the similarity is high, it is possible to display candidates on a screen and to inquire the user about the use method instead of performing an operation of excluding the similar additional vocabulary from candidates.

[Inquiry about Whether to Use]

First, a method of inquiring the user about whether to add the vocabulary may be employed. Similar to the aforementioned example, it is assumed that "go to Funitto" appears as a candidate of the additionally recognized vocabulary for "super Funitto Fuchu store" in a state where the additionally recognized vocabulary "go to Funitsuru" is already present in "Funitsuru hotel". Here, using the voice guidance, it is possible to inquire the user, ""go to Funitto" is similar to "go to Funitsuru". Would you like to add "go to Funitto" to the voice command?". Only when the user determines to add, "go to Funitto" may be added.

[Inquiry about Overwrite or Designation of Plurality of Facilities]

Second, when the similarity is high, it is possible to inquire the user about whether to make a modification such that a new facility may be designated, or plural facilities may be designated using the same vocabulary as the existing additionally recognized vocabulary. For example, there is a case where, in the name database, the additionally recognized vocabulary "go to super Funitto" is already present in the facility "super Funitto Kokubunji store" (282 of FIG. 2A) and in this state, the user adds "super Funitto" as a vocabulary even with respect to the facility "super Funitto Fuchu store". In this case, using the voice guidance, the user is inquired about, ""super Funitto" is already used for "super Funitto Kokubunji store". Would you like to change it to designate "super Funitto Fuchu store, or to designate both facilities?". Through this, an operation of deleting the additionally recognized vocabulary of "super funitto Kokubunji store" and thereby registering "go to super funitto" to "super funitto Fuchu store", or an operation of also registering "go to super funitto" to "super funitto Fuchu store" while maintaining the additionally recognized vocabulary of "super funitto Kokubunji store" may be selectively performed depending on the user selection.

[Processing in a Case where Additional Vocabulary Matches Even as Recognized Vocabulary of Another Facility]

Further, there may be a probability that an additionally recognized vocabulary appearing as a candidate may be used as an additionally recognized vocabulary of another facility. For example, among morpheme combinations included in 910 of FIG. 9A, "funitto" is a morpheme that is included in "super Funitto Kokubunji store" as well as "super Funitto Fuchu store" set by the user. Therefore, the morpheme combination "funitto" may also match as a voice recognized vocabulary of another facility.

Accordingly, an operation of decreasing the importance with respect to the morpheme combination also included in another facility is performed. Through this, it is possible to provide the user with an additionally recognized vocabulary further characterizing the facility designated by the user as a candidate, and to improve usage convenience.

[Adjustment of Morpheme Importance of Facility Name and Preparation of Morpheme Changed Word not Input by User]

Meanwhile, by assigning the importance to a morpheme of a facility, special consideration may be given to a morpheme having a strong level that indicates a characteristic of the facility name. For example, it is assumed that the user inputs "land" via the touch panel to select an amusement park and selects, from among obtained candidates, a facility name "Touzai/Denden/Land" ("/" indicates the morpheme separation). In this case, in the first embodiment, "land" is created as the additionally recognized vocabulary. However, the vocabulary "land" is included in many of amusement parks. Therefore, when other morphemes "touzai" and "denden" are used as additionally recognized vocabularies, the user may easily recognize the facility name. In this case, in the present embodiment, when high importance is assigned to "touzai" and "denden", it is possible to provide the user with the vocabularies "touzai" and "denden" as additionally recognized vocabulary candidates, for example, even though the morphemes are not included in the character string input by the user.

[Rule by Word Class of Morpheme]

Further, in the present embodiment, all the combinations of morphemes are considered as candidates. However, in this method, even an unnatural vocabulary such as "funitto/store" is created. To solve the issue, when creating the morpheme combination, it is possible to prevent the creation by setting the word class based rule such as "a morpheme of word class "others" is used for the morpheme combination only when another morpheme neighboring the morpheme is also present within the morpheme combination".

[Rule by Combination of Word Classes of Morphemes]

Further, considering the morpheme combination, it is possible to determine the importance based on details of the word class. Here, it is assumed that the user inputs "makoma" and selects a facility "Sapporo Makomanai beach" in the name database of FIG. 2A.

It is assumed that the importance of each morpheme of the facility is defined as shown in the table 700 of FIG. 7B. Further, the morpheme input by the user is particularly determined as "Makomanai" by processing of step 810. As shown in 750, 0.5 is added to the morpheme importance of the morpheme "Makomanai".

In step 820, the combination importance about each morpheme combination is calculated by combining the morphemes. Considering the morpheme combination, for example, both names in "Sapporo/Makomanai" is a place name and the user may consider that it is unnatural to use "Sapporo/Makomanai" as a vocabulary used to particularly determine the facility. Meanwhile, "Makomanai/beach" includes both a name place and a category of business and thus, "Makomanai/beach" may be considered as an easily recognizable vocabulary on the user side. Therefore, to consider the ease of recognition, the present embodiment performs an operation of adding the importance of morpheme combination with respect to a combination of different word classes.

The calculation method is shown in FIG. 9C. FIG. 9C is an example of a table 1800 showing the importance calculated for the morpheme combination according to the second embodiment. Initially, with respect to each morpheme combination 1810, the importance of morpheme combination before correction is calculated. Similar to the aforementioned method, all of the morpheme importance are summed and the summation result is divided by the number of morphemes. As a result, the calculation is made as shown in 1820. Next, whether each morpheme combination 1810 includes different word classes is determined. The result is shown in 1830. For example, since "Sapporo/Makomanai/beach" includes two place names, the determination result is "NO". Further, "Sapporo/beach" is a combination of a place name and a category of business and the morphemes are different from each other and thus, the determination result is "YES". Determination is not made for a single. As a result, in the case of "YES", 0.2 is added to the corresponding combination importance.

As a result, combination importance after correction 1840 is calculated. The combination importance after correction is sequentially provided to the user in a descending order.

Therefore, by providing the user with the combination of different word classes beforehand, it is possible to provide the user with an easily recognizable voice recognized vocabulary.

[Combination Between Morpheme and Another Vocabulary of Name Database]

Further, considering the morpheme combination, it is possible to employ a combination between a morpheme within a name and other information included in the name database.

Even here, a case where the user inputs "makoma" and selects the facility "Sapporo Makomanai beach" in the name database 170 of FIG. 2A will be described.

Figure 8:
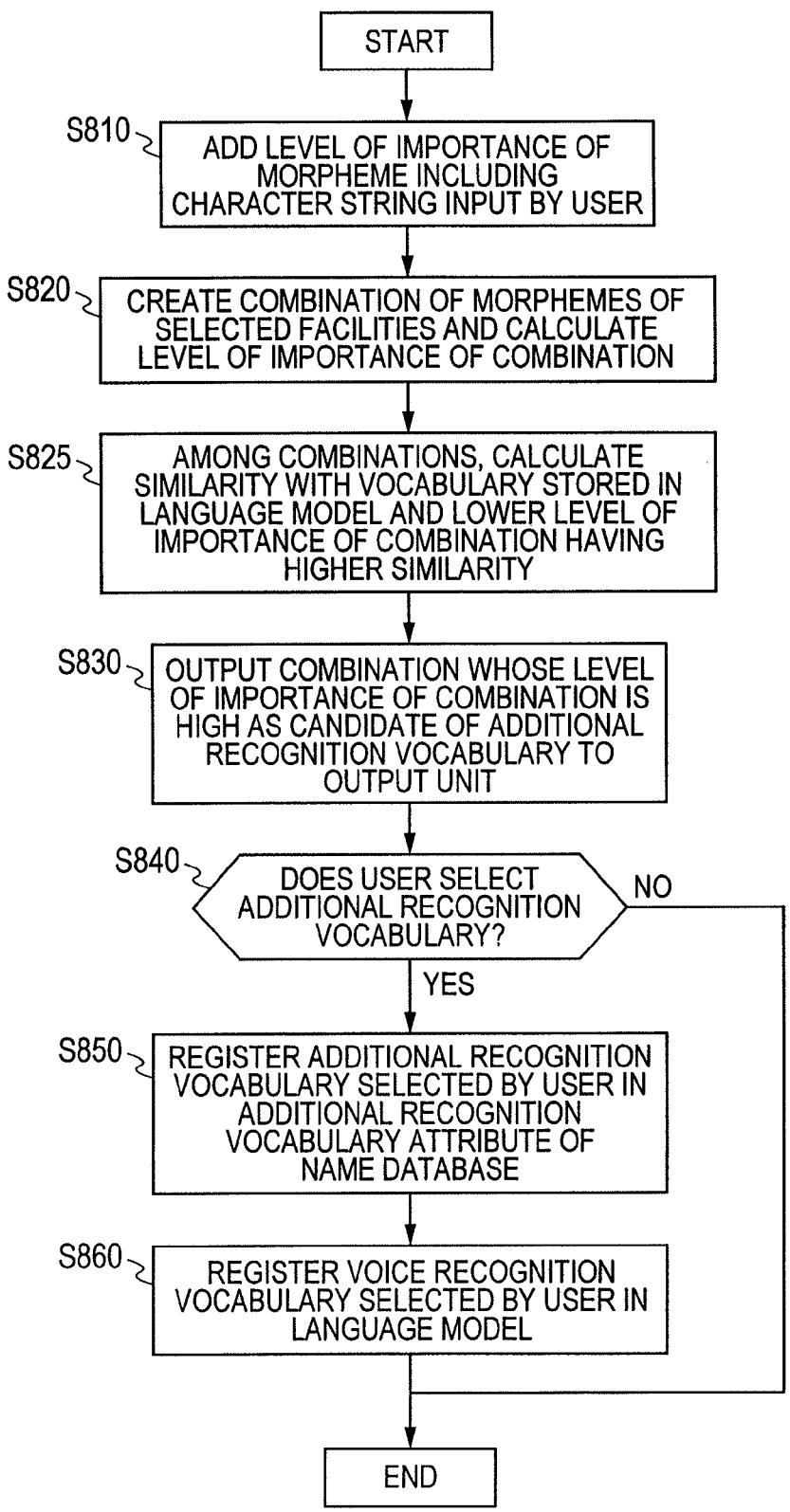
FIG. 8 is a flowchart illustrating a processing order of a recognized vocabulary producing unit according to the second embodiment of the present invention.
Figure 10A:
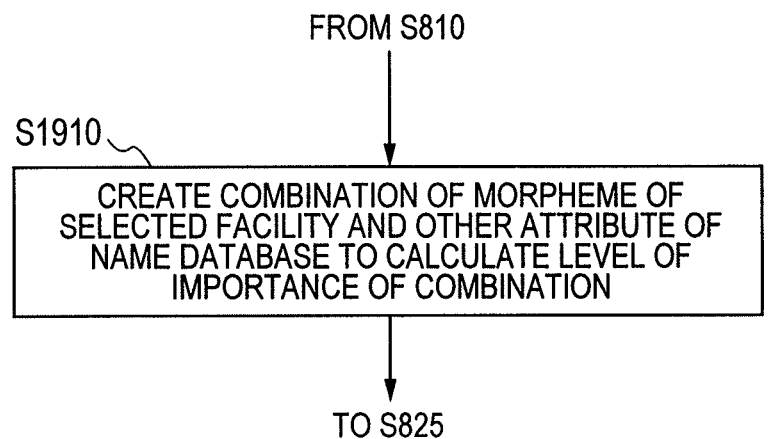
FIG. 10A is a flowchart illustrating a processing order according to the second embodiment.

The present embodiment is performed by replacing processing step 820 in the processing order of FIG. 8 with processing step 1910 of FIG. 10A. While step 820 of FIG. 8 creates the combination of morphemes included in the name, step 1910 of FIG. 10A creates the combination between the morpheme included in the name and other information included in the name database, and calculates the combination importance by considering the created combination as each new morpheme combination.

The specific processing method will be described using a table 1970 of FIG. 10B. Initially, the importance of morpheme combination before correction 1930 is calculated with respect to each morpheme combination 1920 by combining morphemes included in a name. Similar to the aforementioned method, all of the morpheme importance are summed and the summation result is divided by the number of morphemes. Next, supplementation from other information of the name database is performed with respect to each morpheme combination 1920. Here, as an example, supplementation using "Minami-ku" included in an address, a subcategory "swimming place of the name database is performed.

According to the original morpheme combinations, a corresponding morpheme combination may include only a name place, for example, "Sapporo". In this case, when using "swimming place in Sapporo" as an additionally recognized vocabulary by combining the subcategory "swimming place" with the place name, the user may easily retrieve the facility. Meanwhile, with respect to a morpheme of only a category of business such as "beach", when using "beach in Minami-ku" as the additionally recognized vocabulary using an address, the user may easily retrieve the facility. Accordingly, here, in the original morpheme combination 1920, by adding "in Minami-ku" to the end using the address when the place name is not included in the morphemes, and by adding "swimming place in" to the front using the subcategory when the category of business is not included in the morphemes, a new morpheme combination is prepared. Further, with respect to all of the combinations, the combination importance 0.5 is added. Details in a case where the address is added are provided in 1940, and details in a case where the subcategory is added are provided in 1950. Finally, the morpheme combination importance is provided as shown in 1960 and the morpheme combinations may be provided to the user as voice recognized vocabulary candidates. Accordingly, it is possible to provide the user with a voice recognized vocabulary combined with different information such as an address or a category.

Further, in the present embodiment, it is described that when supplementation is performed using information in addition to the name in the name database, the morpheme combination 1920 that is the corresponding base is not provided to the user. However, it is possible to provide the user with details of both the original morpheme combination 1920 and the combination importance 1960. Further, even though the present embodiment describes that an addition method using another information based on details of a word class of a morpheme is modified, another modification method may be performed, or modification may not be performed.

[Automatic Calculation of Morpheme Importance]

Further, the present embodiment considers a case where the morpheme importance is assigned to the name database from the beginning. To determine the importance, a method of determining, by a developer, the importance, or a method based on a user inspection may be considered. Meanwhile, it is possible to estimate the importance according to a calculation method based on the number of appearances of a word such as "tf·idf" that is used for document search.

In addition, a created vocabulary is used for voice recognition. Therefore, considering that a recognition error easily occurs in the voice recognition, it is possible to perform a method of decreasing the importance with respect to a short vocabulary causing the recognition error, a vocabulary whose similar phoneme string is already present, and the like.

Third Embodiment

An information retrieving apparatus according to a third embodiment of the present invention will be described with reference to FIGS. 11 through 13B.

Figure 11:
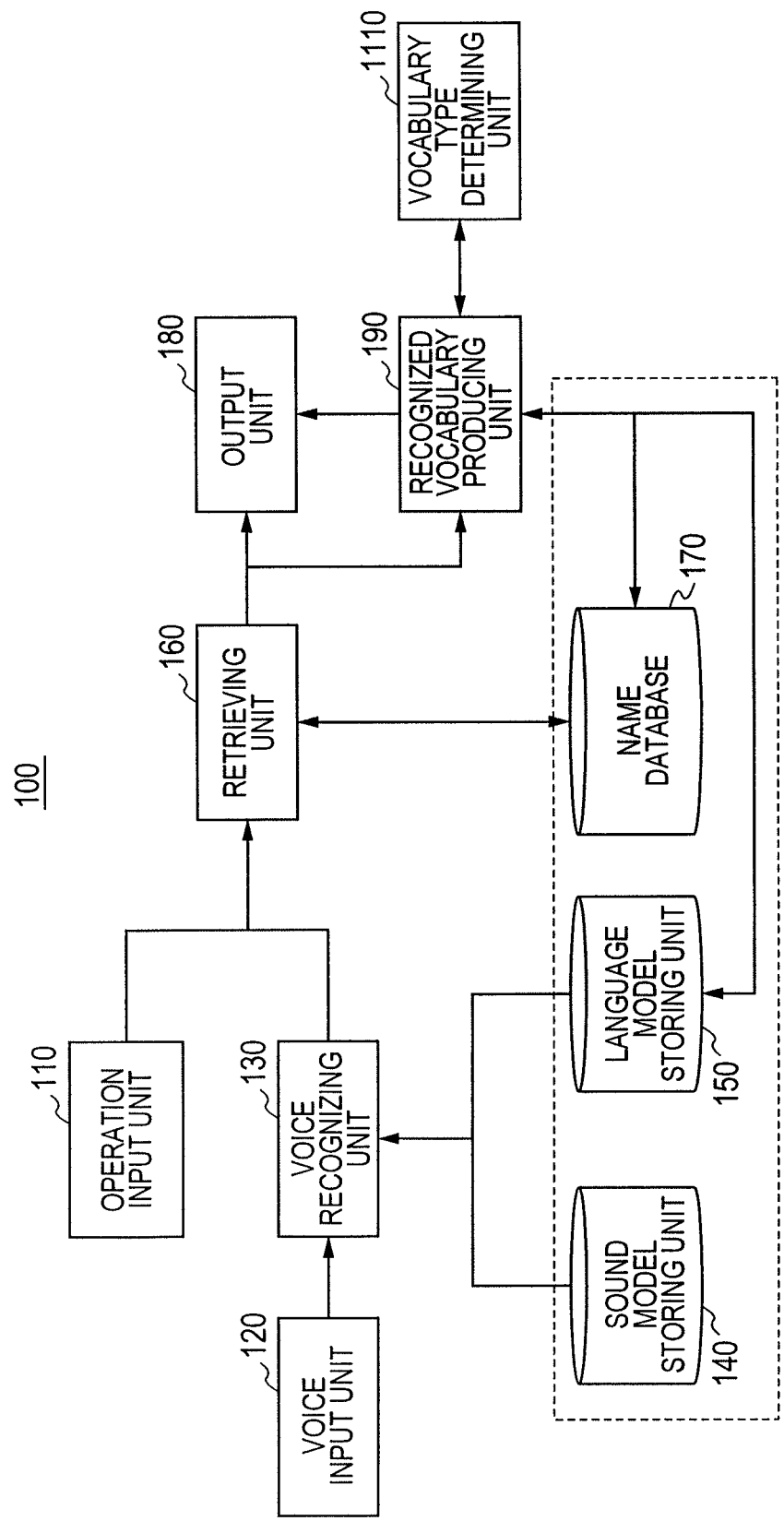
FIG. 11 is a functional block diagram of an information retrieving apparatus according to a third embodiment of the present invention.

Initially, FIG. 11 illustrates a configuration example of the information retrieving apparatus 100 of the present embodiment. In the present embodiment, a vocabulary type determining unit 1110 for determining a type of an additionally recognized vocabulary produced by the recognized vocabulary producing unit 190 is provided in addition to the configuration of the first embodiment. The recognized vocabulary producing unit 190 changes an operation method of registering, to the name database 170, an additionally recognized vocabulary produced by the recognized vocabulary producing unit 190 based on a type of the additionally recognized vocabulary determined by the vocabulary type determining unit 1110, and changes a method of adding, to the language model storing unit 150, the additionally recognized vocabulary produced by the recognized vocabulary producing unit 190. Further, the recognized vocabulary producing unit 190 changes the method of adding the additionally recognized vocabulary to the name database 170 and the language model storing unit 150 based on the determination result of the vocabulary type determining unit 1110. Even though the ID number described above in the first embodiment is not used, configurations of the name database 170, the language model storing unit 150, the dictionary 300, and the like may be realized by applying a method of using the ID number described above in the modification example of the first embodiment.

[Assumption of Third Embodiment]

As an example, similar to the first embodiment, it is assumed that the user inputs "funit" and selects "super Funitto Fuchu store" from among facility name candidates. An operation up to here is the same as the first embodiment and thus, description relating thereto will be omitted here.

[Voice Recognized Vocabulary Indicating Category]

Figure 12:
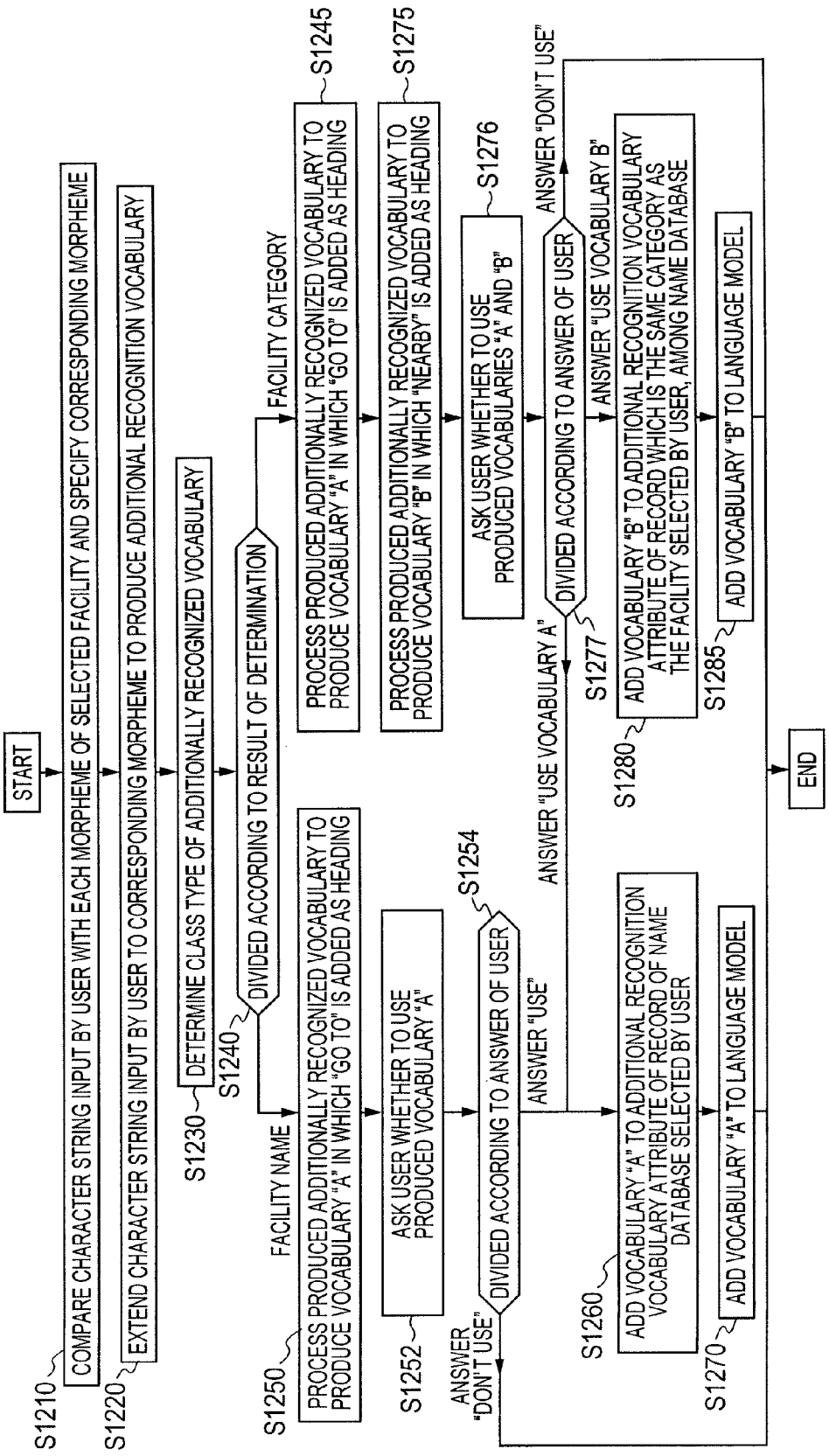
FIG. 12 is a flowchart illustrating a processing order of a recognized vocabulary producing unit and a vocabulary type determining unit according to the third embodiment.

FIG. 12 illustrates a processing flow of the recognized vocabulary producing unit 190 and the vocabulary type determining unit 1110.

In step 1210, the user input character string "funit" is compared with reading of the determined facility name "super Funitto Fuchu store" based on a morpheme unit.

As a result, it can be known that the user input character string "funit" is a portion of the morpheme "Funitto" in reading of "super/Funitto/Fuchu/store".

In step 1220, the user input character string is edited based on the morpheme. Here, the user input character string "funit" is edited as "Funitto" by extending the user input character string up to the corresponding morpheme. The edited "Funitto" is used as the additionally recognized vocabulary.

In step 1230, a type of the additionally recognized vocabulary produced in step 1220 is determined. Here, whether the additionally recognized vocabulary is a vocabulary indicating a general facility name or a facility category is determined.

As the determination method, for example, whether the additionally recognized vocabulary is present in the table is determined by referring to the vocabulary determining table 1300 as shown in FIG. 13A. The vocabulary determining table stores the subcategory ID number 1305 that is a number uniquely assigned to a subcategory, a subcategory 1310, and a vocabulary 1320 corresponding to each subcategory. Here, a vocabulary indicating a predetermined subcategory of the facility is registered to the facility category vocabulary 1320. Specifically, the vocabulary is a chain name, a name of a company having plural branches, and the like. Further, the subcategory corresponds to the subcategory 235 that is the attribute stored in the name database 170. For example, it is assumed that the subcategory "super Funitto" is a chain of a supermarket having plural stores cross the country and vocabularies "Funitto" and "super Funitto" are widely known to people as a name thereof. Therefore, the above vocabularies are registered to the vocabulary 1320.

Hereinafter, the determination method using the vocabulary determining table of FIG. 13A in processing step 1230 will be described. Initially, it can be known that the subcategory 235 of the determined facility name "super Funitto Fuchu store" is "super Funitto" by referring to the name database 170. Therefore, a record whose subcategory 1310 is "super Funitto" is retrieved from the vocabulary determining table. As a result, it can be known that corresponding vocabularies 1320 are two "super Funitto" and "Funitto".

Next, among the corresponding vocabularies 1320, a vocabulary that matches the additionally recognized vocabulary produced in step 1220 is inspected. As a result, the additionally recognized vocabulary "Funitto" matches "Funitto" included in the vocabularies 1320. Therefore, the additionally recognized vocabulary is determined as the facility category.

In step 1240, divergence is performed based on the determination result of step 1230. When the additionally recognized vocabulary is a general facility name, step 1250 is performed. Meanwhile, when the additionally recognized vocabulary is the facility category, step 1245 is performed. That is, the change of the addition method to the name database and the language model based on the type of the additionally recognized vocabulary is realized through this divergence.

Here, the determination result of step 1230 is the facility category and thus, description will be made by proceeding to step 1245.

Since the additionally recognized vocabulary is the vocabulary indicating a certain facility category, processing from step 1245 to step 1285 registers the vocabulary as the voice recognized vocabulary designating the facility category using a method that may be easily used by the user. Here, the registered vocabulary may be used as a nearby facility search that is frequently used for search of the facility category.

In step 1245, the additionally recognized vocabulary is edited. Here, the additionally recognized vocabulary is edited as "go to Funitto" by adding "go to" to the front of a word to be used for general facility search.

In step 1275, the additionally recognized vocabulary is edited using a method different from the method of step 1245. Here, the additionally recognized vocabulary is edited as "nearby Funitto" by adding "nearby" to the front of the word to be used for the nearby facility search.

As described above, in step 1245 and step 1275, the different additionally recognized vocabularies are produced. For the following description, the additionally recognized vocabulary for the general facility search produced in step 1245 is referred to as vocabulary "A", and the additionally recognized vocabulary for the nearby facility search produced in step 1275 is referred to as vocabulary "B".

In step 1276, the user is inquired about which one to use between the produced additionally recognized vocabularies. As an inquiry method, for example, the following voice response is played back from the output unit.

"Setting of the Voice Command Will be Executed."

Please press "1" if you desire to set "super Funitto Fuchu store" in "go to Funitto" as the destination, press "2" if you desire to retrieve nearby super Funitto in "nearby Funitto", and press "3" if you do not desire to execute anything."

In step 1277, a user answer about the user inquiry of step 1276 is received and divergence of processing is performed based on the operation. Here, the answer to the inquiry of step 1276 is received by pressing a button of the touch panel.

When the user presses "1", the vocabulary "A" is selected and thus, divergence to processing step 1260 is performed.

When the user presses "2", the vocabulary "B" is selected and thus, divergence to processing step 1280 is performed.

When the user presses "3", none of the vocabularies are selected and thus, processing is terminated.

With respect to the subsequent processing, a case where the vocabulary "B" is selected will be initially described.

In step 1280, processing corresponding to the case where the vocabulary "B" is selected is performed. Here, the same chain facility as "super Funitto Fuchu store" selected by the user is determined from the subcategory 235. With respect to all of the same chain facilities, "nearby Funitto" is added to the additionally recognized vocabulary attribute. As a result, as shown in 280 of FIG. 2A, the additionally recognized vocabulary "nearby Funitto" is added to two "super Funitto Fuchu store" and "super Funitto Kokubunji store". Further, together with this, it is possible to register a flag indicating that the additionally recognized vocabulary "nearby Funitto" is a vocabulary for the nearby facility search.

In step 1285, the additionally recognized vocabulary "nearby Funitto" is stored in the language model storing unit to be recognizable by voice (350 of FIGS. 3A and 355 of FIG. 3B). Further, together with this, it is possible to register and manage a flag indicating that "nearby Funitto" is the additionally recognized vocabulary and is the vocabulary for the nearby facility search.

An operation corresponding to a case where the user inputs voice with "nearby funitto" after operations of step 1280 and step 1285 will be described. It is assumed that the voice of the user is converted to a digital signal by the voice input unit 120 and then is converted to a character string by the voice recognizing unit 130 and thereby is output as "nearby Funitto". This result is input to the retrieving unit 160.

The retrieving unit 160 compares the voice recognition result and the name database 170. As a result, "super Funitto Fuchu store" and "super Funitto Kokubunji store" including "nearby Funitto" as the additionally recognized vocabulary are obtained as candidates.

Further, they are vocabularies for nearby facility search and thus, whether distances from the facilities obtained as candidates are suitable for the nearby facilities is determined by comparing the facilities with a current location of the car navigation system. As a result, the result determined as the nearby facilities is transmitted to the output unit and a predetermined operation of a car navigation system such as a candidate selection screen, a map display, and a route search is executed.

[Case where Voice Recognized Vocabulary Indicating General Facility Name is Selected]

Next, processing corresponding to the case where the user presses "1" in processing step 1276 and thus, the vocabulary "A" is selected will be described. In this case, the processing proceeds to step 1260.

Processing of step 1260 and step 1270 is processing in the case where the additionally recognized vocabulary is the general facility name. The processing method is almost the same as the first embodiment.

In step 1260, the produced additionally recognized vocabulary is added to the name database. Here, similar to the first embodiment, "go to Funitto" of the vocabulary "A" is added to the additionally recognized vocabulary attribute of "super Funitto Fuchu store" selected by the user. As a result, the addition is performed as shown in 260.

In step 1270, the additionally recognized vocabulary "go to Funitto" is stored in the language model storing unit to be recognizable. Further, together with this, it is possible to register and manage a flag indicating that "go to Funitto" is the additionally recognized vocabulary and the vocabulary for the general facility designation.

An operation, corresponding to a case where the user inputs voice with "go to funitto" after the above operations, will be described. It is assumed that the voice of the user is converted to a digital signal by the voice input unit 120 and then is converted to a character string by the voice recognizing unit 130 whereby the character string "go to Funitto" is output. This result is input to the retrieving unit 160.

The retrieving unit 160 compares the voice recognition result and the name database 170. As a result, as the additionally recognized vocabulary, "super Funitto Fuchu store" including "go to Funitto" is obtained.

Next, a voice response "Destination is set as "super Funitto Fuchu store"" starts from the output unit. A predetermined operation of a car navigation system such as a map display and a route search is executed.

[Case where Only Voice Recognized Vocabulary Indicating General Facility Name is Created]

Another operation of the present embodiment will be described. Here, it is assumed that the user inputs "funittofu" via the touch panel 400 and selects "super Funitto Fuchu store" from among the facility name candidates. An operation up to here is the same as the first embodiment and thus, description relating thereto will be omitted.

FIG. 12 illustrates an operation flow of the recognized vocabulary producing unit 190 and the vocabulary type determining unit 1110.

In step 1210, the user input character string "funittofu" is compared with the determined facility name "super Funitto Fuchu store" based on a morpheme unit.

As a result, it can be known that the user input character string "funittofu" is included in "Funitto" and "Fuchu" in "super/Funitto/Fuchu/store".

In step 1220, the user input character string is edited based on the morphemes. Here, the user input character string "funittofu" is edited as "Funitto Fuchu" by extending the user input character string up to the corresponding morphemes. The edited "Funitto Fuchu" is used as the additionally recognized vocabulary.

In step 1230, a type of the additionally recognized vocabulary produced in step 1220 is determined. Here, whether the voice recognized vocabulary is a vocabulary indicating a general facility name or a facility category is determined.

As described above, the above determination is performed using the vocabulary determining table of FIG. 13A. Specifically, initially, starting from that the subcategory 235 of the determined facility "super Funitto Fuchu store" is "super Funitto", "super Funitto" is found from the subcategory 1310. Next, among the vocabularies 1320 corresponding to "super Funitto", a vocabulary that matches the produced additionally recognized vocabulary is inspected. As a result, "Funitto Fuchu" matches none of the vocabularies 1320. Accordingly, the additionally recognized vocabulary is determined as a portion of the general facility name.

In step 1240, divergence is performed based on the determination result of step 1230. Here, since the additionally recognized vocabulary is the general facility name, step 1250 is performed.

Processing from step 1250 to step 1270 is processing corresponding to the case where the voice recognized vocabulary is the general facility name. The processing method is almost the same as the first embodiment. However, here, processing in which the user selects whether to use the vocabulary is added.

In step 1250, the additionally recognized vocabulary is edited. Here, the additionally recognized vocabulary is edited as "go to Funitto Fuchu" by adding "go to ~" to the front of the word to be used for the general facility search. Further, for the description, the vocabulary is referred to as vocabulary "A".

In step 1252, the user is inquired about whether to use the produced additionally recognized vocabulary. As an inquiry method, for example, the following voice response is played back from the output unit.

"Setting of the voice command will be executed. Would you like to set "super Funitto Fuchu store" in "go to Funitto Fuchu" as the destination? If so, please press "1" and otherwise, please press "2"."

In step 1254, a user answer about the user inquiry of step 1252 is received and divergence of processing is performed based on the operation. Here, the answer to the inquiry of step 1252 is received by pressing a button of the touch panel.

If the user presses "1", the vocabulary "A" is selected and thus, divergence to processing step 1260 is performed.

If the user presses "2", none of the vocabularies are selected and thus, the processing is terminated. In step 1260 and step 1270, the produced additionally recognized vocabulary (vocabulary "A") is added to the additionally recognized vocabulary attribute 250 of the name database. The method is already described and thus, further description relating thereto will be omitted.

Consequently, when the user inputs voice with "go to Funitto Fuchu", the retrieving unit 160 outputs "super Funitto Fuchu store" as a candidate and thereby executes a predetermined operation of a car navigation system such as a map display and a route search.

As described above, according to the present embodiment, it is possible to change a use method of the additionally recognized vocabulary based on a property of a user input vocabulary. Accordingly, it is possible to improve usage convenience of the user.

In the present embodiment, an operation of determining the facility category and thereby performing the nearby facility search using the result is described as an example. Further, at the initial setting point in time of the car navigation system, all of the categories may be set to be recognizable. However, due to a large number of facility category names of a chain and the like, the number of vocabularies to be recognized increases whereby a recognition rate decreases. Therefore, according to the present embodiment, by employing a character string actually input by the user for search, it is possible to retrieve a vocabulary used as a recognized vocabulary. In addition, it is possible to improve the recognition rate and usage convenience.

Even though the present embodiment performs divergence only with respect to the case where the additionally recognized vocabulary is the facility category or the general facility name, plural other divergences may also be performed.

Further, in the present embodiment, whether the vocabulary is present is determined by referring to the table of FIG. 13A. However, other automatically calculable information may be used. For example, a vocabulary type may be determined according to a method based on a frequency of a morpheme that is included in each facility name.

In addition, by providing the user with processing of verifying a use method of the additionally recognized vocabulary, it is possible to provide a voice recognition function that is more suitable for desire of the user.

[Determination Based on Word Class of User Input Character String]

Further, by determining a word class of the user input character string through comparison between the character string input by the user via the touch panel and the morpheme, an operation according thereto may be changed. For example, it is assumed that the user inputs "fuch" and as a result, selects a vocabulary in which the morpheme is "Fuchu", and the word class of the morpheme is a place name. Accordingly, it is estimated that the vocabulary "Fuchu" is the place name familiar to the user. Based on the above result, for example, it is possible to perform an operation of enabling "fuch" to be recognized as the vocabulary "Fuchu" during search by address in the car navigation system, or an operation of comparing "fuch" with another vocabulary and thereby improving the ease of recognition.

[Assignment of Corresponding ID of Language Model Indicating Plurality of Facilities]

Further, in the present embodiment, the search method is described based on the assumption that the additionally recognized vocabulary is retrieved from the reading of the name database using, as a search key, the character string obtained as the voice recognition result. As the search method, similar to the aforementioned first embodiment, the whole case search method and the method using the index may be applied.

In addition, similar to the first embodiment, a method of adding the ID number of the corresponding facility to the dictionary 300 of the language model storing unit in advance and creating, as a candidate, a corresponding facility by referring to the ID number may be applied. However, when performing search by a chain name, plural facilities may correspond to a single recognition result and thus, there is a need to change a method of storing the ID number in the language model to the first embodiment.

Here, the method will be described.

The first method may be a method of registering plural ID numbers in the corresponding ID number 330 when registering the additionally recognized vocabulary to the language model storing unit. Specifically, as described in the embodiment, when retrieving a facility corresponding to the subcategory "super Funitto" using the vocabulary "nearby Funitto", plural ID numbers "0200 and 0201" may be registered to the dictionary 300 of the language model storing unit as the corresponding ID number 330 of the word "nearby Funitto" of FIG. 3A. However, the above method may be applied to a case where the number of facilities belonging to the subcategory "super Funitto" is small like "2" as shown in the name database of FIG. 2A. However, when a large number of facilities, for example, hundreds of facilities are present, the number of ID numbers to be stored in the language model storing unit may increase.

The second method may be a method of registering the subcategory ID number, uniquely assigned to each category, as the corresponding ID number to be stored in the language model. Initially, a relationship between the subcategory ID number and the ID number of the facility corresponding thereto is stored in the form of the table 1302 of FIG. 13B. Further, as shown in FIG. 3C, the corresponding ID number "50001" of the word "nearby Funitto" is stored in the dictionary 300 of the language model storing unit. For example, when the recognition result is "nearby Funitto", the retrieving unit reads the ID number of the corresponding facility from the corresponding ID number "50001" by referring to the table 1302 of FIG. 13B, retrieves a facility having the ID number from the name database, and creates the retrieved facility as a candidate. In this method, there is a need to provide the table as shown in FIG. 13B. However, in many cases, a corresponding relationship between the category and the actual facility is prepared as an index for facility search through category designation that is generally used in the car navigation system. Accordingly, when reusing the index, there is no need to newly prepare the table. Accordingly, search may be quickly performed while maintaining the capacity of the language model storing unit to be small.

[Addition of Substitute Vocabulary of Additionally Recognized Vocabulary]

Further, in the present embodiment, it is described that the length of the user input character string is processed and thereby is used as the additionally recognized vocabulary. However, the vocabulary used as the additionally recognized vocabulary may be a substitute vocabulary that does not match the user input vocabulary based on a character string unit, however, has a semantically deep relationship. For example, the word "Funitto" of the subcategory used in "super Funitto Fuchu store" may be called as a totally different name among people. This different name indicates the substitute vocabulary. In this case, when adding the substitute vocabulary to the name database and the language model while adding "Funitto" to the name database and the language model as the additionally recognized vocabulary, the corresponding facility may be created as a candidate even though the user speaks with the substitute vocabulary.

Fourth Embodiment

An information retrieving apparatus according to a fourth embodiment of the present invention will be described with reference to FIG. 1 and FIGS. 14 through 19. Even though the ID number described above in the modification example of the first embodiment is used, configurations of the name database 170, the language model storing unit 150, the dictionary 300, and the like may be realized by applying a method of not using the ID number.

In the present embodiment, a case where plural attributes retrievable by the user is present in the name database 170 will be described. Further, a case where the user inputs plural queries for search will be described.

In the present embodiment, even though description is made based on a use method of considering a music playback function of a navigation system and performing music search for this, music search and playback may be performed in an audio system independent from the navigation system.

FIG. 14 illustrates an example of the name database 170 in music search. The name database 170 stores a list of music that may be played back in the car navigation system. Information about single piece of music is stored in a single record of the name database 170. An ID number 1405 that is a number uniquely assigned to each piece of music, an artist name 1410, an album title 1420, a music title 1430, a composer name 1440, and explanation 1450 storing commentary of music are used as attributes of music. In addition, a name of a lyric writer, a category of music, and the like may be used. Further, each record does not need to have a value with respect to all of the attributes, and may have a value with respect to a portion of the attributes.

Further, even though values are partially assigned in the name database 170 of FIG. 14, reading and morpheme separation are assigned to each value. In addition, even though not illustrated in FIG. 14, a word class of a morpheme may also be defined.

When selecting music, voice recognition may be used. However, music includes large information and thus, when all of the information is used as the voice recognized vocabulary, a recognition rate may decrease and a processing time may increase. Accordingly, it is assumed that in the case of music search, the language model 150 stores only a vocabulary included in the album title 1420 in the name database and only designation by album title is allowed as the voice input of the user. FIG. 17 illustrates details of the dictionary 300 registered to the language model 150. A word label 1710 and a phoneme string 1720 are prepared only with respect to the album title. Further, in addition to a formal name of the album title, a frequently spoken partial character string (for example, "tanabata") is also registered. Accordingly, for example, even when the user speaks only "tanabata", the user may select an album "TANABATA concert". In addition, a corresponding ID number 1730 is assigned to each word. As the above ID, the ID number assigned to music in the name database of FIG. 14 is stored. Plural corresponding ID numbers is stored in an aspect that plural pieces of music is generally stored in a single album. However, a method of assigning a unique ID number to each album and storing the ID number assigned to the album may be employed.

Further, even though a grammar is omitted, a finite state grammar that may be received with a single speech of each word of the dictionary 300 of FIG. 17 will be used in the same form as the connection rule 360 of FIG. 3B.

Similar to the first embodiment, the touch panel input of the user is received by the operation input unit 110 and the name database 170 is searched using the result.

For example, it is assumed that the user inputs "nichola" via the touch panel.

This character string is transmitted to the retrieving unit 160. The retrieving unit 160 performs search from among the artist name 1410, the album title 1420, the music title 1430, the composer name 1440, the explanation 1450, and an additionally recognized vocabulary 1460 in the name database 170. As a result, three songs that are music including "nichola" in an attribute value are created as candidates.

The search result is transmitted to the output unit 180, and three songs are displayed for the user as candidates on the screen 400 of FIG. 15. The user input character string is displayed on a display area 1510. Attributes and values of a candidate song are displayed on a candidate display area 1520.

After viewing the candidates, the user selects music that the user desires to listen to. For example, it is assumed here that the user selects a music title "letter from Nicholas" and presses the touch panel. The pressing operation is received via the operation input unit 110. Accordingly, a predetermined operation is executed as audio in the car navigation system like playing back music.

Figure 16:
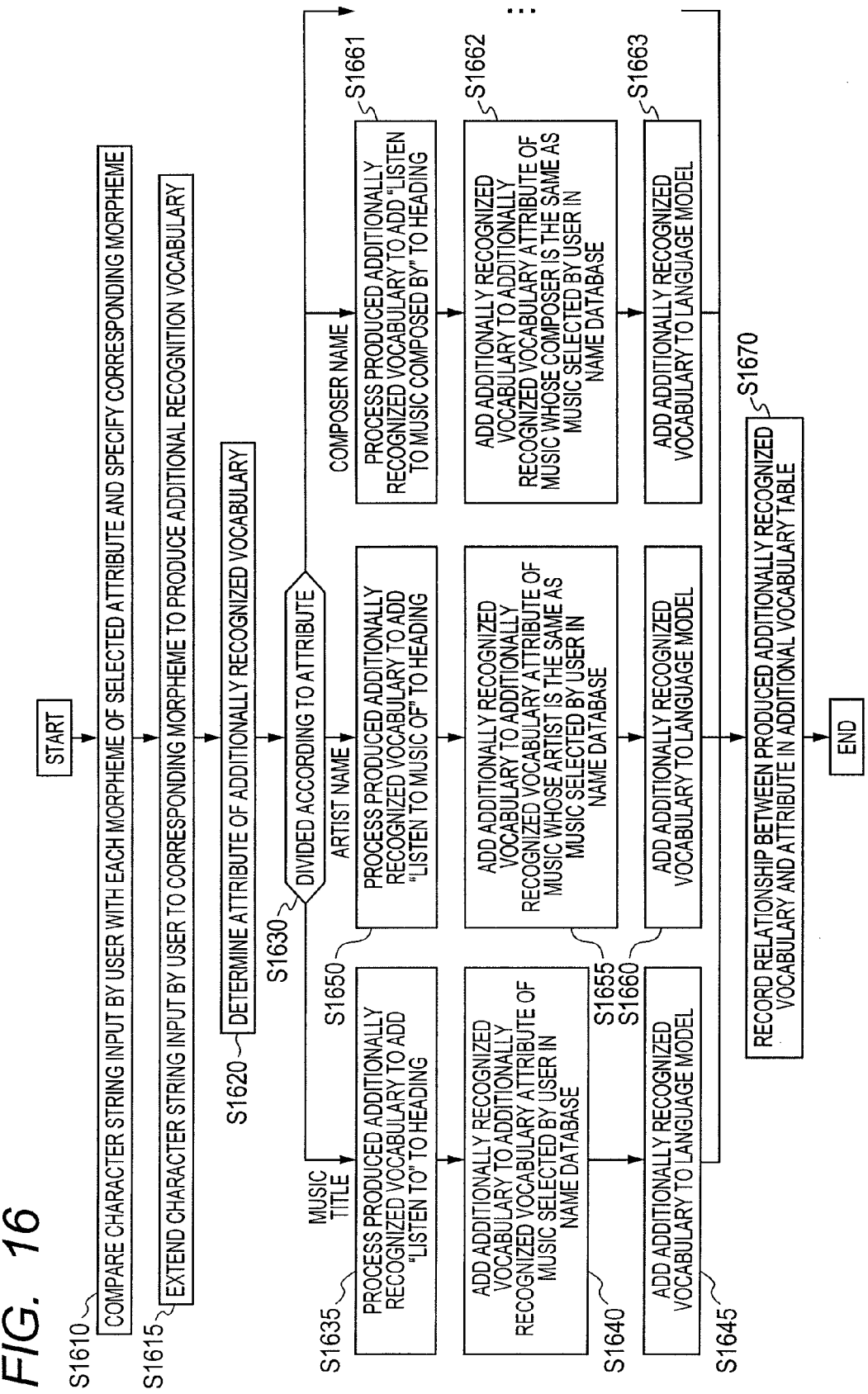
FIG. 16 is a flowchart illustrating a processing order of a recognized vocabulary reproducing unit and a vocabulary type determining unit according to the fourth embodiment.

Next, an operation performed by the recognized vocabulary producing unit 190 and the vocabulary type determining unit 1110 after the above predetermined operations will be described. FIG. 16 illustrates a processing order.

In step 1610, the user input character string "nichola" is compared with the determined music based on a morpheme unit of the value of the attribute including the user input character string in the determined music. Here, the user inputs "nichola" and as a result, selects the music "letter from Nicholas" whose music title matches the user input. Accordingly, the two are compared based on the morpheme unit. As a result, it can be known that the user input character string "nichola" is a portion of the morpheme "Nicholas" in reading "letter/from/Nicholas".

In step 1615, the user input character string is edited based on the morpheme. Here, the user input character string "nichola" is edited as "Nicholas" by extending the user input character string up to the corresponding morpheme. The edited "Nicholas" is used as the additionally recognized vocabulary.

In step 1620, the additionally recognized vocabulary produced in step 1615 is determined. Here, as the determination method, the attribute including the additionally recognized vocabulary is used and the attribute is provided as the determination result. Accordingly, the determination result is the music title.

Further, even though the above method is not employed, the attribute may be determined using another method. For example, by using frequency information of the morpheme included in each attribute of the name database, a list of morphemes having a high absolute frequency or relative frequency is prepared. Next, an attribute of the list including the additionally recognized vocabulary is inspected and the result may be provided as the determination result.

In step 1630, divergence is performed based on the determination result of 1620. Since the determination result is the music title, step 1635 is performed.

In step 1635, the additionally recognized vocabulary is edited. Here, the additionally recognized vocabulary is edited as "listen to Nicholas" by adding "listen to" to the front to be suitable for selection of the music title. Further, a different method may be used as the addition method. For example, like an example of employing "listen to Nicholas something" when "Nicholas" is added to the front of the music title, and employing "listen to something Nicholas" when "Nicholas" is added to the end of the music title, it is possible to employ a method of indicating a location of the additionally recognized vocabulary in a character string of a value of the record.

In step 1640, "listen to Nicholas" is added to the additionally recognized vocabulary attribute 1460 of "letter from Nicholas" selected by the user in the name database. This addition method is shown in 1470 of the name database 170.

In step 1645, the additionally recognized vocabulary "listen to Nicholas" is stored in the language model storing unit to be recognizable. The addition to the dictionary 300 is shown in 1740 of FIG. 17. Further, the ID number in the name database of the corresponding music "letter from Nicholas" is stored in the corresponding ID number 1730. The addition in the grammar is the same as the addition of the connection rule in FIG. 3B and is registered in parallel to the existing grammar path.

Figure 18:
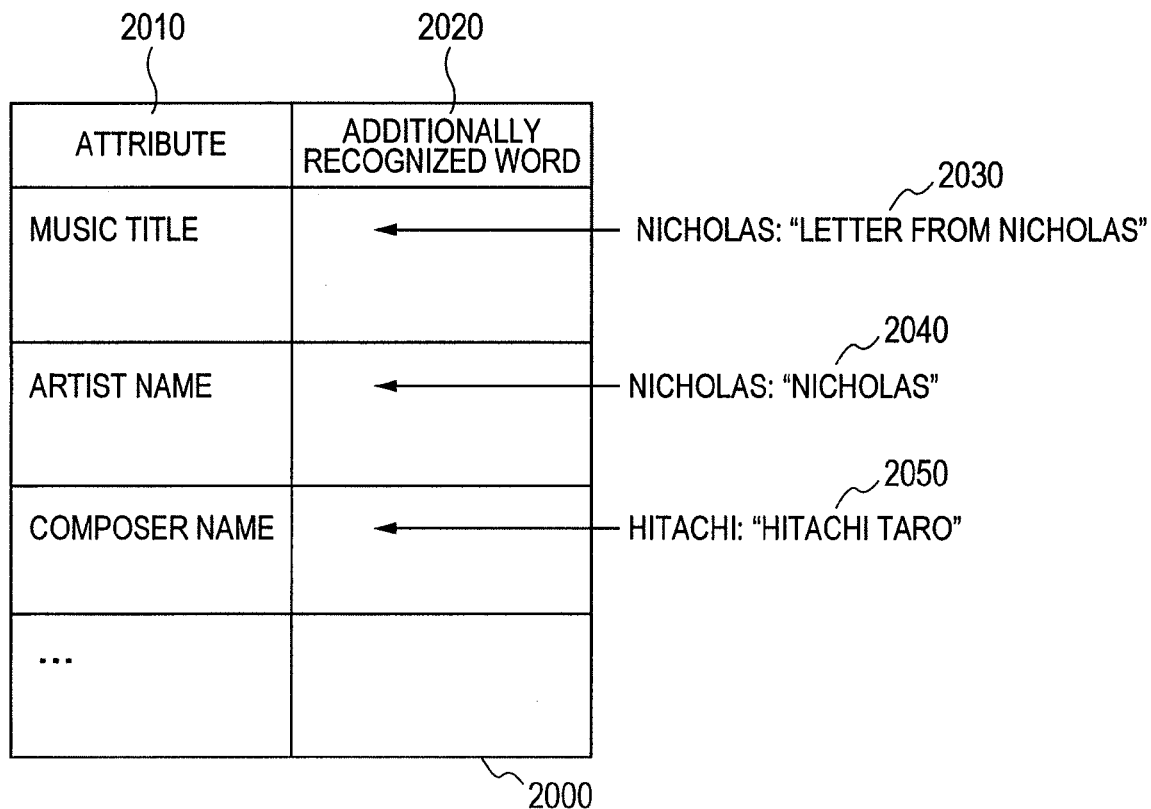
FIG. 18 is a diagram illustrating an example of a table stored in an additionally recognized vocabulary storing unit according to the fourth embodiment.

In step 1670, correspondence among the produced additionally recognized vocabulary, the attribute thereof, and an actually selected value is stored in the additionally recognized vocabulary storing unit that is provided in the storing unit of the information retrieving apparatus 100. FIG. 18 illustrates an example of a table 2000 that is actually stored in the additionally recognized vocabulary storing unit of the information retrieving apparatus 100. In this processing, as shown in 2030 of the table 2000, the vocabulary "Nicholas" produced in step 1615 is added to an additionally recognized vocabulary 2020 whose attribute 2010 corresponds to the "music title". Further, together with this, the music title "letter from Nicholas" that is the value including the additionally recognized vocabulary "Nicholas" is also stored to correspond thereto. The table 2000 of FIG. 18 shows a relationship between the additionally recognized vocabulary and the value as an equation (additionally recognized vocabulary):(value).

An operation corresponding to a case where the user inputs voice with "listen to Nicholas" after the predetermined operations will be described. It is assumed that the voice of the user is converted to a digital signal by the voice input unit 120 and then is converted to a character string by the voice recognizing unit 130 whereby "listen to Nicholas" is output. This result is input to the retrieving unit 160.

The retrieving unit 160 compares the voice recognition result with the name database 170. As a result, the music "letter from Nicholas" including "listen to Nicholas" as the additionally recognized vocabulary is obtained as a candidate.

Further, a method of selecting, by the retrieving unit 160, music may be a method of selecting the music "letter from Nicholas" having the matching ID number from the name database by referring to the corresponding ID number "0004" assigned to the additionally recognized vocabulary "listen to Nicholas".

Next, the result is transmitted to the output unit to thereby execute a predetermined operation such as playback of audio in a car navigation system.

Meanwhile, a case where the user inputs the character string "nichola" and finally selects any one song from among songs of the artist name "Nicholas" will be described.

In this case, in step 1610 and step 1615, the additionally recognized vocabulary "Nicholas" is extracted by performing the same operation as above.

In step 1620, an attribute of the additionally recognized vocabulary produced in step 1615 is determined. As the determination result, an attribute corresponding to a value included in the additionally recognized vocabulary is output. Accordingly, the determination result is the artist name.

In step 1630, divergence is performed based on the determination result of step 1620. Since the determination result is the artist name, step 1650 is performed.

In step 1650, the additionally recognized vocabulary is edited. Here, the additionally recognized vocabulary is edited as "listen to music of Nicholas" by adding "listen to music of" to the front to be suitable for selection of an artist.

In step 1655, with respect to all of songs whose artist name is "Nicholas" in the name database 170, the additionally recognized vocabulary "listen to music of Nicholas" is added to the additionally recognized vocabulary attribute 1460. This addition method is shown in 1480 of the name database 170.

In step 1660, the additionally recognized vocabulary "listen to music of Nicholas" is stored in the language model storing unit to be recognizable. The addition to the dictionary 300 is shown in 1750 of FIG. 17. Here, the ID number in the name database of the song whose artist is "Nicholas" is stored in the corresponding ID number 1730.

In step 1670, correspondence among the produced additionally recognized vocabulary, the attribute including the additionally recognized vocabulary, and the value including the additionally recognized vocabulary is stored in the additionally recognized vocabulary storing unit. In this processing, as shown in 2040 of the table 2000 of FIG. 18, the additionally recognized vocabulary "Nicholas" produced in step 1615 and "Nicholas" that is a value to be retrieved correspond to each other and thereby are added to the additionally recognized vocabulary 2020 corresponding to the "artist name" that is the attribute 2010.

An operation corresponding to a case where the user inputs voice with "listen to music of Nicholas" after the above predetermined operations will be described. It is assumed that the voice of the user is converted to a digital signal by the voice input unit 120 and then is converted to a character string by the voice recognizing unit 130 whereby "listen to music of Nicholas" is output. This result is input to the retrieving unit 160.

The retrieving unit 160 compares the voice recognition result with the name database 170. As a result, two pieces of music including "listen to music of Nicholas" as the additionally recognized vocabulary are obtained as candidates.

Further, a method of selecting, by the retrieving unit 160, music may be a method of selecting two pieces of music having the matching ID number in the name database 170 by referring to the corresponding ID numbers "0001 and 0002" assigned to the voice recognition result "listen to music of Nicholas".

Next, the result is transmitted to the output unit. An operation such as a user selection and playback of music is executed.

Further, even for the different attribute, the same processing may be performed. In step 1661, step 1662, and step 1663, addition of the voice recognized vocabulary in a case where the determination result of the attribute in step 1630 is a composer name is described.

For example, a case where a user inputs "pita" that is a portion of the composer name and finally selects any song of the composer name "Hitachi Taro" will be described.

In this case, in step 1610 and step 1615, the additionally recognized vocabulary "Hitachi" is extracted by performing the same operation as above.

In step 1620, an attribute of the additionally recognized vocabulary produced in step 1615 is determined. As a result, the determination result is a composer.

In step 1630, divergence is performed based on the determination result of step 1620 whereby step 1661 of processing the composer name is performed.

In step 1661, the additionally recognized vocabulary is edited. Here, the additionally recognized vocabulary is edited as "listen to music composed by Hitachi" by adding "listen to music composed by" to the front to be suitable for search by the composer name.

In step 1662, with respect to all of pieces of music whose composer name is "Hitachi Taro" in the name database, the produced vocabulary "listen to music composed by Hitachi" is added to the additionally recognized vocabulary 1460 of the name database 170 (not shown).

In step 1663, the additionally recognized vocabulary "listen to music composed by Hitachi" is stored in the language model storing unit to be recognizable. Here, the ID number in the name database of a song whose composer name is "Hitachi Taro" is stored in the corresponding ID number 1730.

In step 1670, correspondence among the produced additionally recognized vocabulary, the attribute including the additionally recognized vocabulary, and the value including the additionally recognized vocabulary is stored in the additionally recognized vocabulary storing unit. In this processing, as shown in 2050 of the table 2000 of FIG. 18, a pair of the produced additionally recognized vocabulary "Hitachi" produced in step 1615 and the value "Hitachi Taro" are added to the additionally recognized vocabulary 2020 corresponding to the "composer name" that is the attribute 2010.

When the user inputs voice with "listen to music composed by Hitachi" after the predetermined operations, the user may select a song of the composer name "Hitachi Taro".

According to the embodiment, it is possible to produce the voice recognized vocabulary while considering information about an actual attribute of a character string input by the user for search. Therefore, it is possible to provide a voice recognized vocabulary that matches knowledge of the user and is easily available.

[Search Using Plurality of Additionally Recognized Vocabularies]

Next, a method of performing further detailed search by combining additional voice recognized vocabularies that are accumulated during a use history of the user will be described.

A case where three user inputs described according to the fourth embodiment are consecutively performed will be considered:

That is, (1) The user inputs "nichola" via the touch panel and selects a song whose music title is "letter from Nicholas".

(2) The user inputs "nichola" via the touch panel and selects a song whose artist name is "Nicholas".

(3) The user inputs "pita" via the touch panel and selects a song whose composer name is "Hitachi Taro".

A case where the (1) through (3) are consecutively performed is assumed.

In this case, as shown in FIG. 18, in data of the additionally recognized vocabulary storing unit, the additionally recognized vocabulary "Nicholas" 2030 is stored in the attribute "music title", the additionally recognized vocabulary "Nicholas" 2040 is stored in the attribute "artist name", and the additionally recognized vocabulary "Hitachi" 2050 is registered in the attribute "composer name".

Next, the recognized vocabulary producing unit 190 combines plural additionally recognized vocabularies by referring to additionally recognized vocabularies stored in the additionally recognized vocabulary storing unit and thereby edits the name database and the language model storing unit so that search may be performed even with speech.

Figure 19:
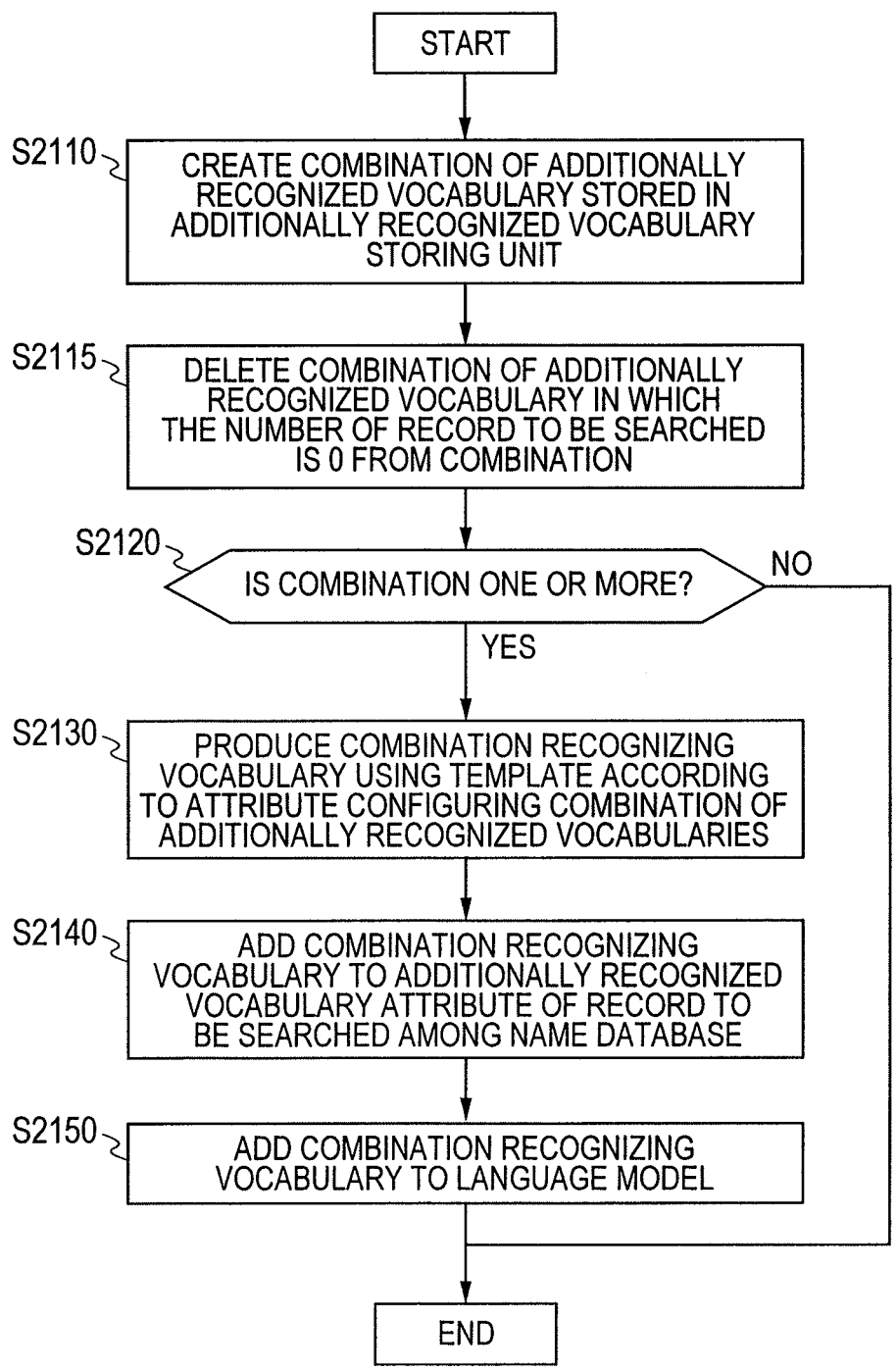
FIG. 19 is a flowchart illustrating a processing order of a recognized vocabulary producing unit according to the fourth embodiment.

Processing of the recognized vocabulary producing unit 190 for the above case will be described with reference to FIG. 19.

In step 2110, a combination of additionally recognized vocabularies stored in the additionally recognized vocabulary storing unit is produced. Even though plural rules may be employed to create the combination, the following criteria are employed here.

- Additionally recognized vocabularies having different attributes are combined.
- Attribute "music title" is excluded from creation of the combination.

According to the method, a combination of 2040 and 2050 is created as the combination. That is, combination of (attribute=artistic name, additionally recognized vocabulary="Nicholas", value="Nicholas") and (attribute=composer name, additionally recognized vocabulary="Hitachi", value="Hitachi Taro") is generated. The number of combinations is one.

In step 2115, when even a single record cannot be retrieved by inspecting whether there is a retrievable record using the combination produced in step 2110, the combination is deleted. In this case, the number of combinations produced in step 2110 is one, and there is music whose artist name is "Nicholas" and composer name is "Hitachi Taro" (music of ID number "0002"). Therefore, the combination is not deleted and step 2120 is performed.

In step 2120, whether at least one combination remains after processing of step 2115 is determined. In this case, since a single combination remains, step 2130 is performed. For example, when no combination remains, processing is terminated.

In step 2130, a combination recognizing vocabulary that is a new recognizing vocabulary is produced using the combination. In producing the combination recognizing vocabulary, a template is provided based on an attribute constituting the combination. It is assumed that plural templates are provided based on a word order in which the user may naturally speak. For example, examples of templates are as follows:

(1) listen to/music of (artist name)/composed by (composer name)

(2) listen to/music of (artist name)/in (music category name)

The combination recognizing vocabulary is produced by inputting the additionally recognized vocabulary constituting the combination to any of the templates. Here, attributes included in the combination are the artist name and the composer name. Accordingly, the following combination recognizing vocabulary is created by inputting the produced additionally recognized vocabularies ("Hitachi" and "Nicholas", respectively,) to (composer name) and (artist name), respectively, using the template (1).

"listen to music of Nicholas composed by Hitachi"

In step 2140, the combination recognizing vocabulary produced in step 2130 is added to an additionally recognized vocabulary attribute of a corresponding record of the name database. Specifically, since the combination recognizing vocabulary corresponds to music of the ID number "0002", the addition is performed as shown in 1490 of the name database of FIG. 14. Even though the present description is made based on a case where the number of music to be retrieved is only one, the addition is performed with respect to each piece of music in a case where plural pieces of music are present.

In step 2150, the combination recognizing vocabulary "listen to music of Nicholas composed by Hitachi" is stored in the language model storing unit to be recognizable. Here, the ID number "0002" of music to be retrieved is stored in the corresponding ID number 1730.

When the user inputs voice with "listen to music of Nicholas composed by Hitachi" after the predetermined operations, the user may select a song whose artist name is "Nicholas" using the composer name "Hitachi Taro".

According to the embodiments, even when the user desires to perform search using plural conditions, the user may perform search based on natural expression of the user.

[Extension to Plurality of Attributes]

Further, even though the determination of processing step 1620 according to the fourth embodiment employs, as the determination result, a single attribute including the user input character string, plural attributes may be employed as the determination result.

For example, a case where the user inputs the character string "nichola" and selects music "letter from Nicholas" from candidates may be considered. In this case, according to the embodiment, processing of adding the additionally recognized vocabulary "listen to Nicholas" to the music "letter from Nicholas" is performed.

However, the voice recognized vocabulary "Nicholas" obtained in step 1615 is included in plural attributes such as the artist name in addition to the music title. Therefore, the vocabulary "Nicholas" is not limited to the music title and the artist name and thus, may be thought to be the vocabulary easily recognizable by the user. Alternatively, the selected music may match plural attributes of a record whose input character string is one such as a case where "Nicholas" is included in the music title and the artist name is also "Nicholas".

In this case, when using the vocabulary "Nicholas" even for selection of the artist name instead of being limited to the music title, it is possible to improve usage convenience.

Processing considering the aspect will be described. Initially, after terminating general processing steps 1635, 1640, and 1645 with respect to the attribute "music title", processing steps 1650, 1655, and 1660 with respect to the attribute "artist" are performed. Here, processing of step 1655 is modified from the method described with reference to FIG. 16. That is, music whose artist name is "Nicholas" is found from all of pieces of music included in the name database, and "listen to music of Nicholas" is assigned to an additionally recognized vocabulary attribute of each piece of music.

Accordingly, when the user speaks "listen to Nicholas", the user may retrieve the music "letter from Nicholas". Further, when the user speaks "listen to music of Nicholas", the user may retrieve the music whose artist name is "Nicholas".

[Use of Plurality of Conditions in User Input Character String]

Further, in the present embodiment, description is made based on the assumption that the user initially inputs a single query via the touch panel and the like. However, search may be performed by inputting plural queries even in the case of character string input. For example, it is assumed that the user inputs two character strings "Beetho" and "moo" and retrieves music having both the character strings (AND search). As a result, it is assumed that the user selects music whose composer is "Beethoven" and a music title is "moonlight". Here, "Beethoven" may be used as the voice recognized vocabulary for composer selection, and "moonlight" may be used as the voice recognized vocabulary for music title section.

[Configuration of Plurality of Terminals]

Further, the present embodiment is performed based on a single terminal. However, the above configurations may be mounted to other terminals. Specifically, in search by music title, for example, known is a use method of inputting a character string via a keyboard on a personal computer and thereby retrieving music. Here, correspondence between the character string input for search and the finally selected music is stored. In addition, an additionally recognized vocabulary for each piece of music is produced according to the embodiment of the present invention.

Next, a case where music retrieved on the personal computer is played back in an installation device such as a car navigation system, a portable audio device, and the like may be considered. Here, in addition to data of music, the additionally recognized vocabulary is also simultaneously moved to the installation device. Accordingly, when the user selects the music in the installation device, the user may designate the additionally recognized vocabulary using a voice input.

The present embodiment contributes to a use separation of performing the keyboard input on the personal computer in which the keyboard input is easy, and performing the voice input in the installation device in which a size of the touch panel and the like is reduced. Accordingly, it is possible to improve usage convenience.

Even though the embodiments of the present invention are described using a facility search and a music search in a car navigation system as an example, the present invention may also be applied even for use in general information search devices.

Further, the embodiments of the present invention may be combined with each other and thereby be applied.

REFERENCE SIGNS LIST

100 . . . Information retrieving apparatus
110 . . . Operation input unit
120 . . . Voice input unit
130 . . . Voice recognizing unit
140 . . . Sound model storing unit
150 . . . Language model storing unit
160 . . . Retrieving unit
170 . . . Name database
180 . . . Output unit
190 . . . Recognized vocabulary producing unit
300 . . . Dictionary of language model
400 . . . Touch panel
700 . . . Table defining morpheme importance
900 . . . Table showing combination importance
1000 . . . Display screen
1110 . . . Vocabulary type determining unit
1300 . . . Vocabulary determining table
2000 . . . Table stored in additionally recognized vocabulary storing unit.

The invention claimed is:

1. An information retrieving apparatus comprising:
a name database that registers at least one record as a unit, each of the record contains at least one attribute to be retrieved and a value associated with the attribute, wherein the value is content about each of the attribute;
an operation input unit that receives an operation input of a user;
a voice input unit that receives a voice input of the user;
a voice recognizing unit that recognizes voice obtained from the voice input unit as a character string;
a sound model storing unit that stores sound data referred by the voice recognizing unit;
a language model storing unit that stores, as a language model, a vocabulary recognized by the voice recognizing unit and a connection rule of the corresponding vocabulary;
a retrieving unit that retrieves the value of the attribute included in the name database using an input character string input from the operation input unit or the voice recognizing unit, and creates, as a candidate, the record in which the input character string is included in the value;
an output unit that outputs, as the search result, the candidate of the record created by the retrieving unit;
a selecting unit that selects the output candidate of the record; and
a recognized vocabulary producing unit that receives a selection result of the record by the selecting unit, and produces a new additionally recognized vocabulary that is a voice recognized vocabulary to be added to the language model,
wherein the recognized vocabulary producing unit records, in the name database or the language model, a corresponding relationship between the additionally recognized vocabulary corresponding to the input character string and the selected record.

2. The information retrieving apparatus according to claim 1,
wherein the recognized vocabulary producing unit registers the additionally recognized vocabulary as the single attribute in the record of the name database selected by the selecting means, and adds the additionally recognized vocabulary to the language model storing unit.

3. The information retrieving apparatus according to claim 1,
wherein the additionally recognized vocabulary produced by the recognized vocabulary producing unit is the character string input from the operation input unit.

4. The information retrieving apparatus according to claim 1,
wherein each vocabulary stored in the language model storing unit is stored together with an identifier that indicates the corresponding record of the name database,
wherein the voice recognizing unit outputs the identifier corresponding to the recognized vocabulary together with the recognized vocabulary,
wherein the retrieving unit creates, as a candidate, a record having the same identifier as the name database by referring to the identifier assigned to the vocabulary output by the voice recognizing unit, and
wherein the recognized vocabulary producing unit produces the additionally recognized vocabulary based on the output of the retrieving unit, and adds the additionally recognized vocabulary to the language model storing unit in a form of combining the identifier corresponding to the selected record of the name database with the produced additionally recognized vocabulary.

5. The information retrieving apparatus according to claim 1,
wherein, when the additionally recognized vocabulary is output from the voice recognizing unit, the retrieving unit includes, in the search result, the record of the name database including the additionally recognized vocabulary.

6. The information retrieving apparatus according to claim 1,
wherein, when a plurality of additionally recognized vocabularies is output from the voice recognizing unit, the retrieving unit creates a candidate set of the record by retrieving an additionally recognized vocabulary attribute of the name database based on each of the additionally recognized vocabularies output from the voice recognizing unit, and outputs, as the search result, only a record present in all of the candidate sets of the record that are obtained through search of the respective additionally recognized vocabularies, or outputs, as the search result, collection of records present in at least one candidate set among the candidate sets that are obtained through search of the respective additionally recognized vocabularies.

7. The information retrieving apparatus according to claim 1,
wherein the recognized vocabulary producing unit uses, as the additionally recognized vocabulary, a vocabulary obtained by editing the character string input from the operation input unit using a predetermined method.

8. The information retrieving apparatus according to claim 7,
wherein the recognized vocabulary producing unit uses, as the additionally recognized vocabulary, a vocabulary obtained by editing the character string input from the operation input unit based on a unit of a morpheme of separating the character string that is received in a value of each attribute registered to the name database.

9. The information retrieving apparatus according to claim 1,
wherein the recognized vocabulary producing unit produces the single or the plurality of additionally recognized vocabularies by combining morphemes of separating the character string of a value received in the attribute of the record selected by the selecting means, based on comparison between the character string input from the operation input unit and the selected record.

10. The information retrieving apparatus according to claim 9,
wherein the recognized vocabulary producing unit produces the single or the plurality of additionally recognized vocabularies by combining the morphemes of separating the character string of the value received in the attribute of the record selected by the selecting means, and determines the additionally recognized vocabulary to be adopted based on a type of the morpheme.

11. The information retrieving apparatus according to claim 1, further comprising:
a vocabulary type determining unit that determines a type of the additionally recognized vocabulary produced by the recognized vocabulary producing unit,
wherein the recognized vocabulary producing unit additionally has a function of changing a method of adding the corresponding additionally recognized vocabulary to the name database and the language model storing unit based on the type of the additionally recognized vocabulary determined by the vocabulary type determining unit,
wherein the vocabulary type determining unit compares a value of each attribute in a user selected record that is the record selected by the selecting unit with an input character string that is the character string input from the operation input unit, and outputs, as the determination result, the attribute in the user selected record including the input character string, and
wherein the retrieving unit reads the value of the attribute in the user selected record, retrieves a matching record that is a record matching the value, from the attribute in the name database, and adds the produced additionally recognized vocabulary to an additionally recognized vocabulary.

12. The information retrieving apparatus according to claim 1,
wherein the recognized vocabulary producing unit calculates a similarity between the produced additionally recognized vocabulary and the character string stored as the value in the language model storing unit or the attribute of the name database, and enumerates similar vocabularies that are vocabularies similar to the produced additionally recognized vocabulary, and changes a method of adding the produced additionally recognized vocabulary to the name database and the language model when there is a corresponding similar vocabulary.

13. The information retrieving apparatus according to claim 1,
wherein, in addition to the produced additionally recognized vocabulary, the recognized vocabulary producing unit produces a new additionally recognized vocabulary by combining any one attribute of the name database and the additionally recognized vocabulary.

\* \* \* \* \*